US011489750B2

(12) United States Patent
Huang et al.

(10) Patent No.: US 11,489,750 B2
(45) Date of Patent: Nov. 1, 2022

(54) AUTOMATIC TEST SYSTEM AND DEVICE THEREOF

(71) Applicant: AmTRAN Technology Co., Ltd., New Taipei (TW)

(72) Inventors: Chin-Kun Huang, New Taipei (TW); Yu-Ruei Li, New Taipei (TW); Peng-Ta Chiu, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 88 days.

(21) Appl. No.: 17/110,328

(22) Filed: Dec. 3, 2020

(65) Prior Publication Data

US 2021/0176157 A1 Jun. 10, 2021

(51) Int. Cl.
*H04L 43/50* (2022.01)
*H04L 49/253* (2022.01)
*H04L 43/12* (2022.01)

(52) U.S. Cl.
CPC .............. *H04L 43/50* (2013.01); *H04L 43/12* (2013.01); *H04L 49/253* (2013.01)

(58) Field of Classification Search
CPC ........ H04L 43/50; H04L 43/12; H04L 49/253
See application file for complete search history.

(56) References Cited

U.S. PATENT DOCUMENTS

| 5,351,201 A | 9/1994 | Harshbarger, Jr. et al. |
| 5,572,444 A | 11/1996 | Lentz et al. |
| 6,741,277 B1 | 5/2004 | Rau |
| 7,023,470 B2 | 4/2006 | Braun et al. |
| 7,283,139 B1 | 10/2007 | Tanaka |
| 7,664,317 B1 | 2/2010 | Sowerby |
| 8,743,211 B2 | 6/2014 | Beazley |
| 8,842,185 B1 | 9/2014 | Spears et al. |
| 8,994,617 B2 | 3/2015 | Chaji et al. |
| 9,380,297 B1 | 6/2016 | Djurdjevic |
| 9,462,266 B2 | 10/2016 | Qian et al. |
| 9,906,782 B2 | 2/2018 | Martin et al. |
| 9,948,927 B2 | 4/2018 | Kuehnis et al. |
| 10,089,754 B2 | 10/2018 | Tomioka |

(Continued)

FOREIGN PATENT DOCUMENTS

| CN | 103578463 A | 2/2014 |
| CN | 106324475 A | 1/2017 |

(Continued)

*Primary Examiner* — Jae Y Lee
(74) *Attorney, Agent, or Firm* — CKC & Partners Co., LLC

(57) ABSTRACT

An automatic test device is disclosed. The automatic test device is includes connection ports, a processor, and a transmission integrated interface. The connection ports is configured to couple to a device under test. The processor is coupled to the connection ports and is configured to transmit a test instruction through the connection ports to the device under test. The device under test is in a test mode after receiving the test instruction, and the first processor is configured to receive a test signal transmitted through the connection ports from the device under test when the device under test is in the test mode. The transmission integrated interface is coupled between the connection ports and the processor, and is configured to transmit at least one of the test instructions to the connection ports or the processor. An automatic test system is also disclosed herein.

10 Claims, 16 Drawing Sheets

(56) References Cited

U.S. PATENT DOCUMENTS

| | | |
|---|---|---|
| 10,237,593 B2 | 3/2019 | Joshi et al. |
| 10,425,627 B2 | 9/2019 | Zhang et al. |
| 10,971,044 B2 | 4/2021 | Pedeville et al. |
| 11,334,308 B2 | 5/2022 | Yu |
| 2001/0016060 A1 | 8/2001 | Ahn et al. |
| 2005/0286753 A1 | 12/2005 | Ho |
| 2006/0279633 A1 | 12/2006 | Oka |
| 2007/0070254 A1 | 3/2007 | Cazier et al. |
| 2008/0062164 A1 | 3/2008 | Bassi et al. |
| 2009/0122132 A1 | 5/2009 | Thielman et al. |
| 2011/0202799 A1 | 8/2011 | Pagani |
| 2013/0057706 A1 | 3/2013 | Steinberg et al. |
| 2013/0108065 A1* | 5/2013 | Mullins ............ G01R 31/31701 324/750.3 |
| 2013/0346815 A1 | 12/2013 | Casim et al. |
| 2014/0254897 A1 | 9/2014 | Ferguson |
| 2014/0267780 A1 | 9/2014 | Spears et al. |
| 2016/0124822 A1* | 5/2016 | Remple ................. G06F 11/267 714/30 |
| 2016/0165226 A1 | 6/2016 | Djurdjevic |
| 2017/0188023 A1 | 6/2017 | Brabenac et al. |
| 2017/0264892 A1 | 9/2017 | Kuehnis et al. |
| 2018/0103331 A1* | 4/2018 | Ostrin ................. H04R 29/001 |
| 2018/0332261 A1 | 11/2018 | Zhang et al. |
| 2020/0344434 A1* | 10/2020 | Ueda ....................... H04N 5/44 |
| 2020/0380907 A1 | 12/2020 | Marcu et al. |
| 2021/0176157 A1 | 6/2021 | Huang et al. |

FOREIGN PATENT DOCUMENTS

| | | |
|---|---|---|
| CN | 109145813 A | 1/2019 |
| CN | 109618151 A | 4/2019 |
| TW | 200600807 A | 1/2006 |
| TW | 200634316 A | 10/2006 |
| TW | 201409227 A | 3/2014 |
| TW | I676040 B | 11/2019 |

* cited by examiner

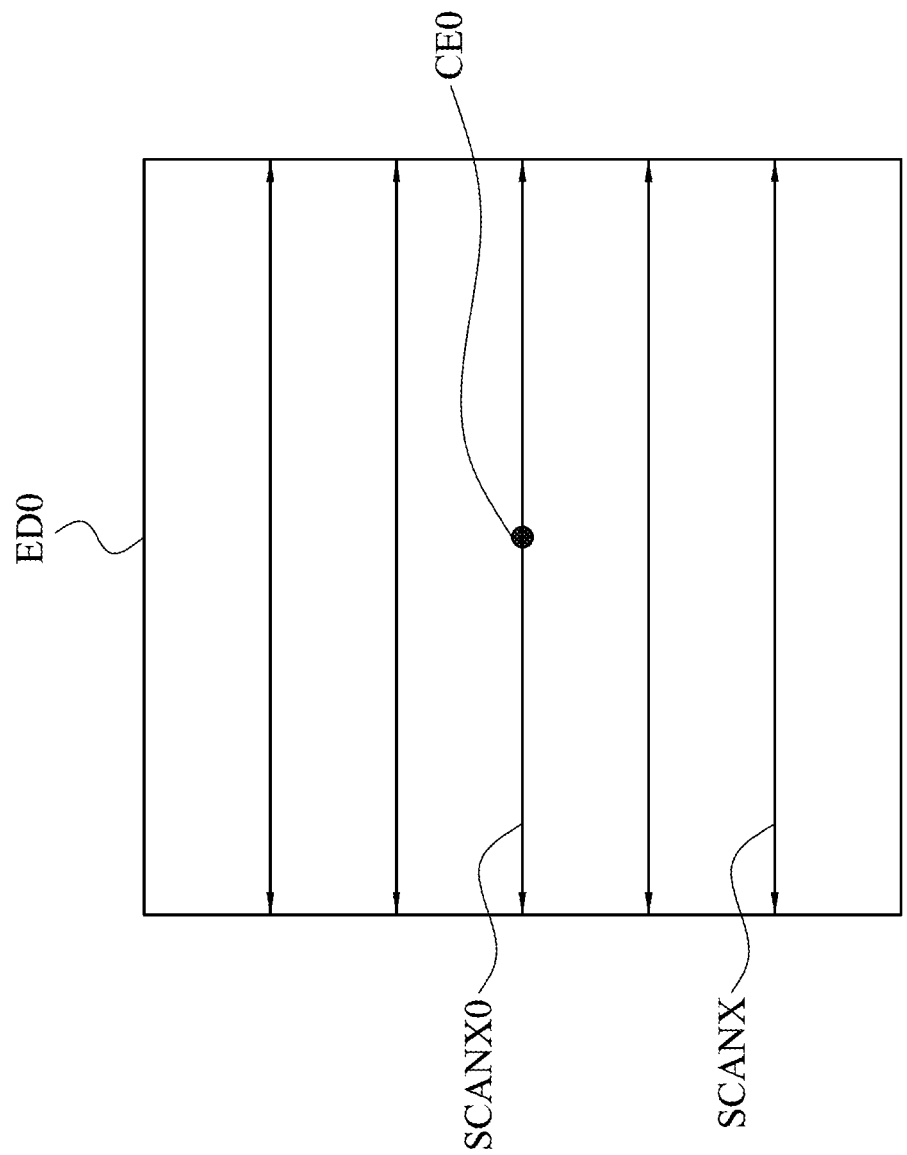

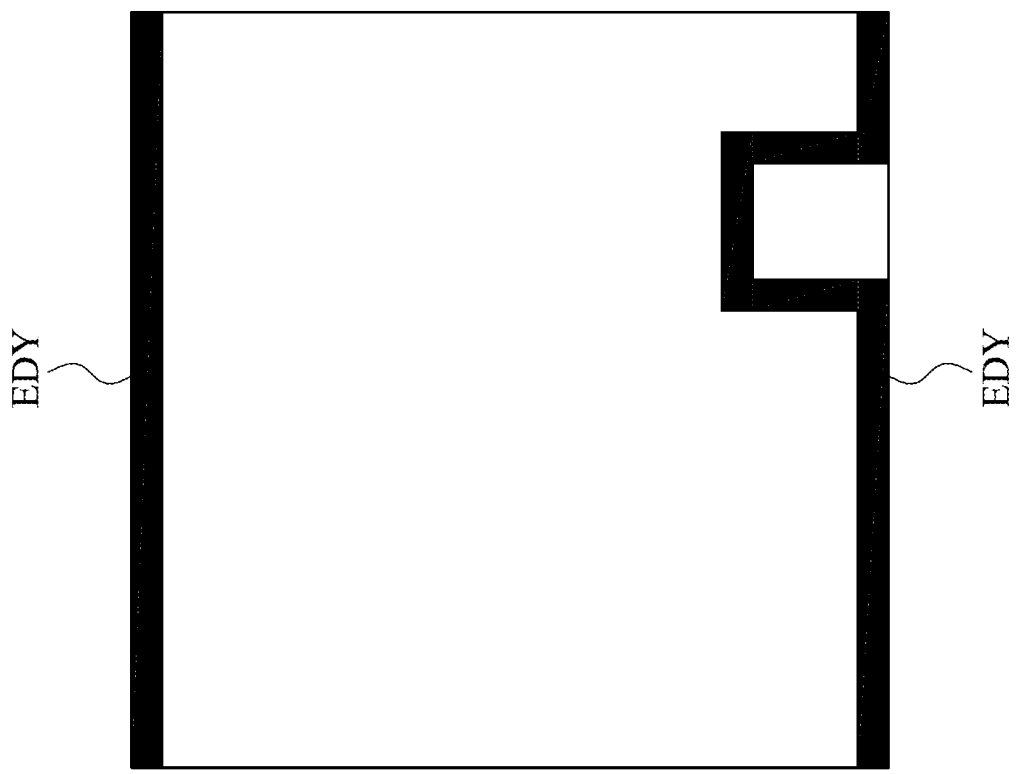

US 11,489,750 B2

AUTOMATIC TEST SYSTEM AND DEVICE THEREOF

CROSS-REFERENCE TO RELATED APPLICATION

This application claims priority to Taiwan Application Serial Number 108144363, filed Dec. 4, 2019, all of which are herein incorporated by reference.

BACKGROUND

Field of Invention

The present invention relates to a test method, and especially relates to an automatic test method for testing functions of a device under test.

Description of Related Art

The fabrication of an electronic device includes tests before leaving the factory, for checking whether some specific functions of the electronic device work normally. For example, for a television, test items include image display, audio functions, and wireless communications, etc. However, in test operations, products under test are performed one by one by man, and it leads to rising cost of human resource and also rising possibility of misjudgment. On the other hand, in the test operations for testing audio functions, it is hard to judge stereo audio effect accurately by man, and it is affected by other noise in the factory or other factors. Furthermore, it causes false judgments in the test operations.

SUMMARY

The invention provides an automatic test device which is configured to test functions of a device under test. The automatic test device includes connection ports, a first processor and a transmission integrated interface. The connection ports are configured to couple to the device under test. The first processor is coupled to the connection ports and is configured to transmit a test instruction through the connection ports to the device under test. The device under test is in a test mode after receiving the test instruction, and first processor is configured to receive a test signal transmitted through the connection ports from the device under test in the test mode. The transmission integrated interface is coupled between the connection ports and the first processor, and is configured to transmit at least one of the test instruction or the test signal to the connection ports or the first processor.

The invention also provides an automatic test system which is configured to test functions of a plurality of devices under test. The automatic test system includes a transmission structure and automatic test devices. The transmission structure is configured to carry the plurality of devices under test and transmit the devices under test to function test stops correspondingly. The automatic test devices are disposed on the transmission structure and are configured to dispose the plurality of devices under test. Each of the automatic test devices includes connection ports, a processor and a transmission integrated interface. The connection ports are configured to couple to a device under test of the plurality of devices under test. The processor is coupled to the connection ports and is configured to transmit a test instruction through the connection ports to the device under test. The device under test is in a test mode after receiving the test instruction. The processor is configured to receive a test signal transmitted through the connection ports from the device under test in the test mode. The transmission integrated interface is coupled between the connection ports and the processor, and is configured to transmit one or more than one of the test instruction or the test signal to the connection ports or the processor.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 8A is a schematic diagram of a test photo, in accordance with an embodiment shown in FIG. 7.

FIG. 8D is a schematic diagram of a test photo, in accordance with an embodiment shown in FIG. 8B.

DETAILED DESCRIPTION

Figure 1:
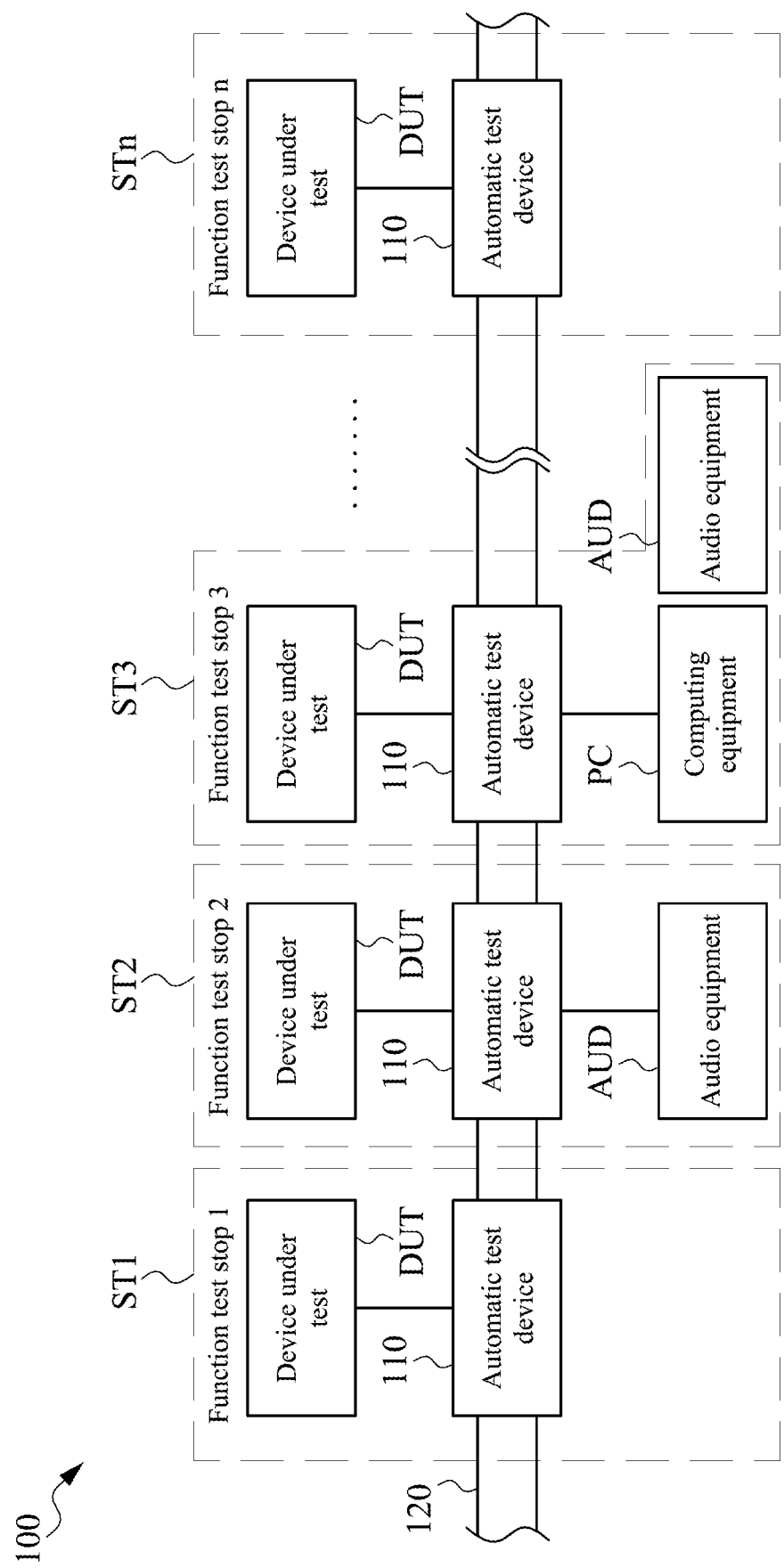
FIG. 1 is a block diagram of an automatic test system, in accordance with an embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. Besides, although the terms "first," "second," etc., may be used herein to describe various elements, these terms are used to distinguish one element from another. Unless the context indicates otherwise clearly, these terms does not specifically refer to or imply order or sequence, nor does they intend to limit the present invention.

An automatic test system of the present disclosure provides functions for testing electronic products and utilizes an automatic test method to implement performing tests automatically on the electronic products. For example, when the electronic products are at the last end of a factory before leaving the factory, it may cover deficiency by replacing a conventional manner, which is the electronic products being tested by man, with a provided manner, which is the electronic products being tested by the automatic test system for checking fundamental functions of the electronic products.

With reference to FIG. 1, an automatic test system 100 includes a transmission structure 120, audio equipment AUD and a plurality of automatic test devices 110. Electronic products to be tested (i.e., devices under test DUT, hereinafter) are coupled to the automatic test devices 110. Each of the automatic test devices 110 is coupled to one of the devices under test DUT correspondingly, and is disposed on the transmission structure 120.

In some embodiments, jigs (not shown) are disposed on the transmission structure 120, for arranging the devices under test DUT fixed.

As illustrated in FIG. 1, the transmission structure 120 is configured to carry the automatic test devices 110 and the corresponding devices under test DUT. In the present embodiment, the transmission structure 120 is a transmission strap, and the products disposed on the transmission structure 120 are moved to target stops by a driving device (not shown) of the transmission structure 120. In the present embodiment, the transmission structure 120 is able to carry the automatic test devices 110 and the corresponding devices under test DUT, and to transmit that the same to respective function test stops ST1, ST2, ST3, . . . , STn (for simplicity, each of which is referenced as STn hereinafter for illustration).

According to information including, for example, categories and model numbers, of the devices under test DUT, function test stops STn are arranged in the automatic test system 100, for testing various functions of the devices under test DUT correspondingly. In various embodiments of the present disclosure, television is an exemplary illustration of each of the devices under test DUT, and such device under test DUT may be a product with a specific model number of a specific television brand. For such product with the specific model number, test items include its own image display function, voice output function (also referred to as voice/audio function), wireless transmission function, and so on. In some embodiments, another exemplary illustration of one of the devices under test DUT is a computer or a cell phone, and the test items further include communication function and fundamental computing function, etc., and it is not limited by the provided embodiments of the present disclosure.

Among the function test stops STn, a function test stop ST2 shown in FIG. 1 is arranged for testing image display function and audio function. An audio equipment AUD is arranged. The audio equipment AUD is coupled to the automatic test device 110 and the corresponding device under test DUT, for assisting in the test operations to sample test signals.

In some examples for testing image display function and audio function of the device under test DUT, when the transmission structure 120 transmits the device under test DUT to one of the function test stops (e.g., the function test stop ST2), the automatic test device 110 provides sample data to the device under test DUT, and the audio equipment AUD records the sample data played by the device under test DUT and generates corresponding audio content. Continuously, the automatic test device 110 compares the sample data with the recorded audio content, in order to implement the function test.

In an embodiment, the automatic test device 110 includes a storage module (not shown), configured to store sample data including various brand and various models thereof correspondingly. When the automatic device 110 is coupled to the device under test DUT, the automatic test device 110 detects the brand and the model number of this device under test DUT automatically by comparing the sample date stored in the storage module with the information received from the device under test DUT.

In another embodiment, an external electronic device (e.g., a computing equipment PC of the present disclosure) is coupled to the automatic test devices 110, configured to set the information including, for example, the brands and the model numbers of the corresponding devices under test DUT. For example, the computing equipment PC sets the brand and the model number of one of the device under test DUT through a wire physical interface (e.g., USB, UART or RS232 interface) or through a wireless interface (e.g., Bluetooth or WIFI interface). Continuously, the automatic test device 110 selects the corresponding sample data including the set brand and model numbers, and transmits such sample data to the corresponding device under test DUT. When the corresponding device under test DUT plays the sample data according to test instruction from the automatic test device 110, the audio equipment AUD captures the sample data played by this device under test DUT, generates corresponding image data and voice data, and transmits these image data and voice data to the automatic test device 110. The automatic test device 110 generates test results which indicate that the device under test DUT are dysfunctional or functional by comparing the data transmit from audio equipment AUD with selected sample data corresponding to the device under test DUT.

When the test results indicate as dysfunction, the automatic test device 110 alarms, for alerting operators in the factory that such device under test DUT works abnormally. When the test results do not indicate as dysfunction, the transmission structure 120 transmits the device under test DUT to the next function test stop STn continuously, in order to carry on other test items. For example, the device under test DUT is transmitted from the function test stop ST2 to the next function test stop ST3 by the transmission structure 120.

In some embodiments, the automatic test device 110 is provided with functions including storing, communicating and computing, configured to store sample data, to transmit the sample data to the device under test DUT, and to analyze signals (which are also indicated as information such as captured image data or voice data discussed above) received in the test operations, and to generate test results.

Among the function test stops STn, a function test stop ST3 shown in FIG. 1 is arranged for testing the image display function and the audio function. The audio equipment AUD and the computing equipment PC are arranged. The audio equipment AUD is coupled to the automatic test device 110 and the computing equipment PC, for assisting in the test operations to capture the signals played by the device under test DUT. The computing equipment PC is coupled to the automatic test device 110 and the audio equipment AUD, for assisting to analyze data.

In some examples for testing the image display function and the audio function of the device under test DUT, when the transmission structure 120 transmits the device under test DUT to one of the function test stops STn (e.g., the function test stop ST3), the computing equipment PC sends a command to the automatic test device 110 to set the sample data corresponding to the such device under test DUT, and to order the automatic test device 110 and the audio equipment AUD perform the image display of the test operations. In the test operations, the automatic test device 110 control the device under test DUT to play the sample data, and controls the audio equipment AUD to capture the sample data played by the device under test DUT and generate corresponding audio signals. In one embodiment, the audio equipment AUD transmits the captured audio signals (e.g., photos and voice) in analog data format to the computing equipment PC. The computing equipment PC analyzes these audio signals and sample data, and generates the test results of the image display function and the audio function accordingly.

In another embodiment, the automatic test device 110 provides the sample data to the device under test DUT and obtains the audio/video signals from the audio equipment AUD. The automatic test device 110 is able to compare the pre-stored sample data with the obtained audio/video signals, and to generate the test results.

The signals or the data are transmitted by specific transmission interface according to the test items of the devices under test DUT. For example, a television of brand A may transmit images and voices through a HDMI interface, and a television of brand B may transmit images and voices through a VGA interface. The transmission interface of the A brand-television and the B brand-television are different from each other. The automatic test device 110 provided in the present disclosure is able to integrate various transmit interfaces and corresponding transmission protocols thereof. Therefore, only one structural device is able to operate tests in the televisions of various brands.

Figure 2:
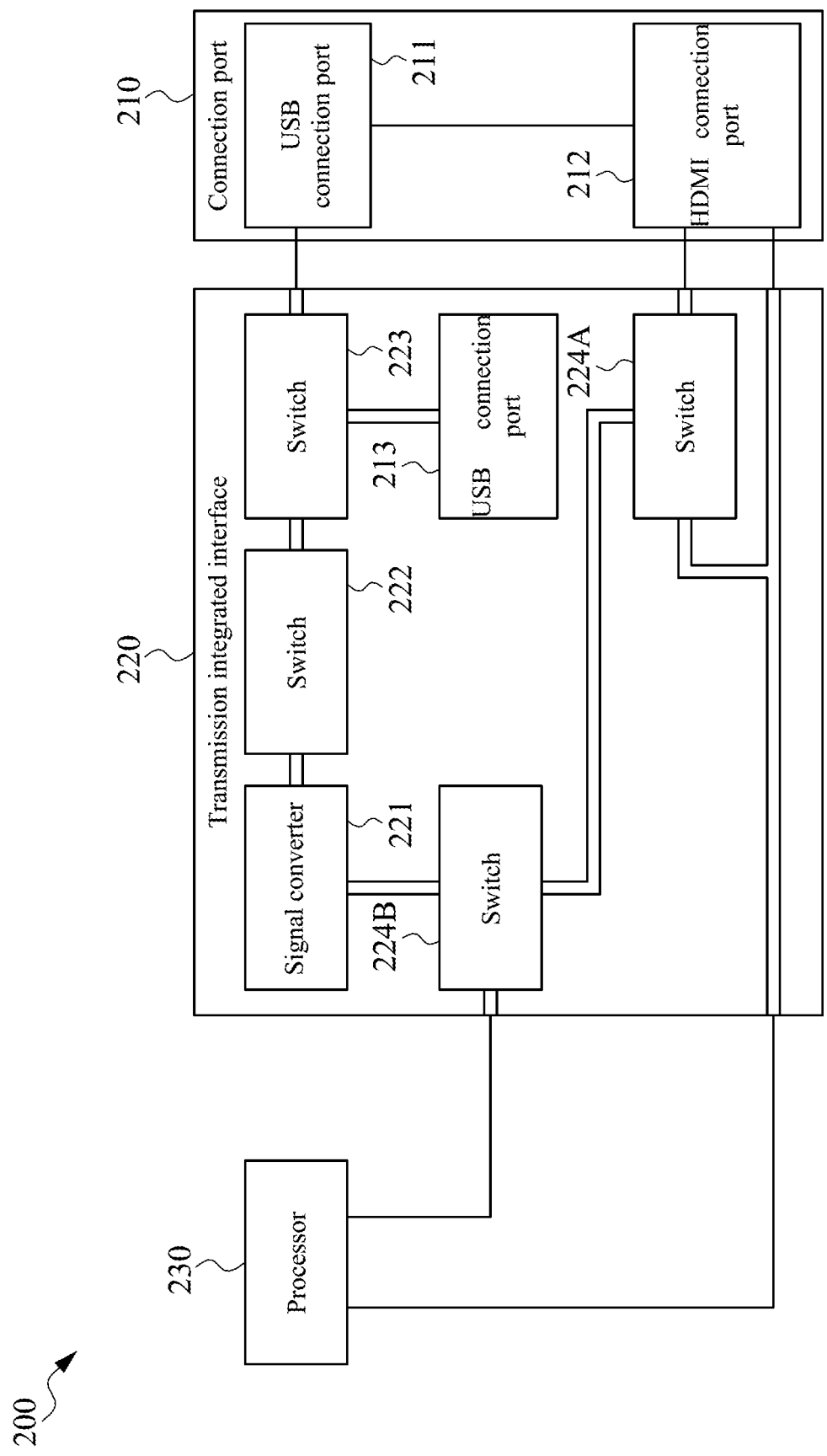
FIG. 2 is a block diagram of an automatic test device, in accordance with an embodiment shown in FIG. 1.

FIG. 2 is an embodiment of one of the automatic test devices 110 shown in FIG. 1. As illustrated in FIG. 2, the automatic test device 200 includes a connection port 210, a transmission integrated interface 220, and a processor 230, wherein all of these elements will be discussed in detail below.

The connection port 210 is configured to couple to the device under test DUT, referred to as a physical connection port for external connection structure of the automatic test device 200. In some embodiments, the connection port 210 includes connection interfaces that follow the corresponding transmission protocols, and is configured to transmit the signal (also referred to as data) between the transmission integrated interface 220 and the device under test DUT.

As illustrated in FIG. 2, the connection port 210 includes two connection interfaces. The transmission protocols of the two connection interfaces are not compatible to each other. The connection interfaces may be USB interface or HDMI interface.

In some examples, the USB connection port 211 is an USB 3.0 interface and compatible to UASP (USB attached SCSI protocol) transmission protocol, configured to transmit digital signals through the USB connection port 211, based on the UASP transmission protocol. The HDMI connection port 212 is a HDMI D type interface and compatible to HDMI 2.1 transmission protocol, configured to transmit digital signals or analog signals through the HDMI connection port 212, based on the HDMI 2.1 transmission protocol.

In some embodiments, the automatic test device 200 transmit the testing instructions through the USB connection port 211 or the HDMI connection port 212, in order to set conditions of the device under test DUT for being in a test mode or a factory mode of the same to perform the mentioned test operations.

In addition, the connection port 210 further includes a third connection interface (not shown). When the device under test DUT is in the test mode or the factory mode, the automatic test device 200 transmits and sets data that are irrelative to the conditions of the device under test DUT through the third connection interface. For example, the automatic test device 200 transmits the sample data or receives the audio signals (i.e., the signals including the image signals and the voice signals), generated based on the corresponding sample data from the device under test DUT, through the third connection interface. The third connection interface is compatible with interfaces including, for example, HDMI for video transmission, component video connector of YPbPr interface and audio L/R for video transmission, component video connector of CVBS interface and audio L/R for video transmission, and consumer electronics control (CEC) for wireless communication, ARC interface for voice transmission, optical interface and coaxial interface for voice transmission, analog L/R for voice transmission, Ethernet interface (which includes a DHCP server simulated by a processor) for wireless communication, WIFI interface (which includes wireless access points (AP) set by a processor) for wireless communication, Bluetooth interface for wireless communication, and USB on-the-go (USB OTG) (which includes a USB pen driver simulated by a processor) for communication function.

The connection interface of the connection port 210 includes various transmission interfaces that are different from each other. Accordingly, it provides various devices under test DUT or various test items. A number of the connection interfaces is not limited by the embodiments of the present disclosure.

The transmission integrated interface 220 is coupled between the connection port 210 and the processor 230, and is indicated as a signal communication bridge of the automatic test device 200. As mentioned above, since the connection port 210 includes various connection interfaces compatible to various transmission protocols, the transmission interface 220 may transfer the signals in various transmission protocols. Therefore, the automatic test device 200 is able to test the devices under test DUT with various brands and model numbers, and it does not require to re-arrange a corresponding external adaptor for a specific device under test DUT. Accordingly, the automatic test device 200 not only behaves with good using flexibility, but also increases performance of the test operations.

As illustrated in FIG. 2, the transmission integrated interface 220 includes a signal converter 221 and switches 222, 223, 224A and 224B. By turning on or off these switches 222, 223, 224A and 224B and by operating the signal converter 221 together, transmission formats of the signals may be converted in the transmission integrated interface 220, in order to be compatible with various transmission protocols. The implement of being compatible with various transmission protocols in the transmission integrated interface 220 of the present invention will be discussed in detail below.

In the present embodiment, the processor 230 only supports UART communication format. Alternatively stated, all signals transmitted to the processor 230 must have UART communication format. However, various devices under test DUT may utilize different communication interfaces, configured to communicate with external devices with different communication protocols.

In some embodiments, the device under test DUT is merely configured to transmit UART signals through a data signal pair channel of the USB interface (e.g., D+/D− signal pair channel). Utilizing the automatic test device 200, the signals may be able to transmit with UART communication format in the mentioned interface. Specifically, for example, the automatic test device 200 is connected to the device under test DUT through the USB connection port 211. A path from the USB connection port 211 through the switches 223, 222 to the switch 224B is formed. The device under test DUT and the processor 230 may communicate to each other in UART format data via the path.

In some embodiments, the device under test DUT is merely configured to transmit UART signals through a DDC channel. The automatic test device 200 is connected to the devices under test DUT through the HDMI connection port 212. A path from the HDMI connection port 212 through the switch 224A to the switch 224B is formed for the communication of the device under test DUT and the processor 230.

In addition, the switch 223 is configured to be coupled to another USB connection port 213. It may receive the signals transmitted through the USB connection port 213 by such as, an USB pen drive. The signals of the USB connection port 213 are transmitted in the USB communication format, and transmitted through the path from the USB connection port 213 through the switch 223 to the switch 222, and through the signal converter 221 to the switch 224B for the communication of the processor 230 and the USB pen driver.

It should be noted that, the signal converter 221 is configured to convert the communication formats between the USB and the UART. For example, when the USB connection port 213 receives the signals in USB communication format, the signals may be further transmitted through the path to the processor 230, and such path is formed from the switch 223 through the switch 222 to the signal converter 221, and further to the switch 224B. Utilizing the signal converter 221 to convert the communication formats from the USB communication format to the UART communication format, it is efficient to be identified and processed by the processor 230. On the other hand, the signals in the UART communication format that are transmitted from the processor 230 may be converted into the signals in the USB communication format by the signal converter 221, in order to be transmitted these signals to equipment connected to the USB connection ports 211 and 213.

In some embodiments, the processor 230 is indicated as a single board computer, for example, raspberry Pi, which is a processor which includes computing and storing functions. In some embodiments, the processor 230 is indicated as a computer that has higher computing and storing functions compared to the raspberry Pi. The processor 230 is configured to generate test instructions for ordering the device under test DUT, configured to compute and analyze the signals generated in the test operations including, for example, analog signals (e.g., the captured video signals) and digital signals (e.g., the signals in digital format converting from the captured video signals), and configured to generate the test results.

In some embodiments, the processor 230 is coupled to another processor (e.g., the computing equipment PC shown in FIGS. 1 and 3), configured to assist to analyze the test results. In some examples, similar to that shown in FIG. 1, the processor 230 is coupled to the computing equipment PC (e.g., a computer) at the function test stop ST3. The processor 230 is configured to generate test instructions for ordering the device under test DUT. The computing equipment PC is configured to compute and analyze the analog signals or the digital signals generated in the test operations, and configured to generate the analyzed results.

The processor 230 is arranged as an equipment with various computing performance, based on some considerations including costs and test items of the automatic test device 200, such as some various embodiments discussed above which is not limited thereof.

Continued with the above discussion, the test instructions are data for ordering the device under test DUT by the processor 230. The test instructions include a triggered signal that ordering the device under test DUT to start the test operations, and a triggered signal that ordering the device under test DUT enter the test mode or the factory mode.

Besides, the test signals are data that transmitted from the device under test DUT to other receiver in the test operations. To explain in another way, the receiver is referred to as a third equipment, configured to simulate as a user watching the television that may receive voices or images.

In some embodiments, the receiver is indicated as the automatic test device 200 that receives the date output from the device under test DUT through the third connection interface (not shown) of the connection port 210. For example, the voice signal played by the device under test DUT is received by an audio return channel (ARC). In another embodiment, the receiver is indicated as microphones RMIC and LMIC, and a camera CAM shown in FIG. 3. The microphones RMIC, LMIC and the camera CAM capture the image data and voice data played by the device under test DUT, and then transmit these image data and voice data to the computing equipment PC.

To conclude, the transmission integrated interface 220 and the connection port 210, which includes the USB connection port 211 and the HDMI connection port 212, transmit the test instructions to the devices under test DUT with various brands or model numbers, in order to support signals with various format output from the devices under test DUT. Continuously, the connection port 210 transmits the sample data to the devices under test DUT for performing the test operations. The connection port 210 or other receiver (e.g., camera or microphone) receives video signals including, for example, voice and/or images, played in the test operations. The automatic test device 200 or the computing equipment PC analyzes compared sample data and the video signals, configured to generate the test results of the image display function and/or audio function.

In some embodiments, the test items including the image display function and voice function of the device under test DUT are analyzed and compared by the computing equipment PC. Only the signals that are transmitted through wire (e.g., Aux, Opt, coaxial, ARC) are directly transmitted back to the automatic test device 200 for comparison.

In some embodiments that the automatic test device 200 is configured to analyze and compare the signals, the automatic test device 200 transmits the test results through the connection port 210 and these test results are illustrated by the corresponding devices under test DUT. In some embodiments that the computing equipment PC is configured to analyze and compare the signals, the test results are illustrated by the computing equipment PC.

The automatic test device 200 integrates the signals with various data formats that are incompatible with each other by the transmission integrated interface 220, in order to transmit the signals based on the corresponding transmission protocols. Meanwhile, the automatic test device 200 generates the test instructions by the processor 230, in order to operate the test operations on the devices under test DUT. Accordingly, the automatic test device 200 may test the devices under test DUT with various brands or model numbers, and it may also increase the performance of the test operations and decrease the cost of the same. Therefore, the automatic test device 200 may replace the convention by man and avoid some deficiencies of the convention.

Figure 3:
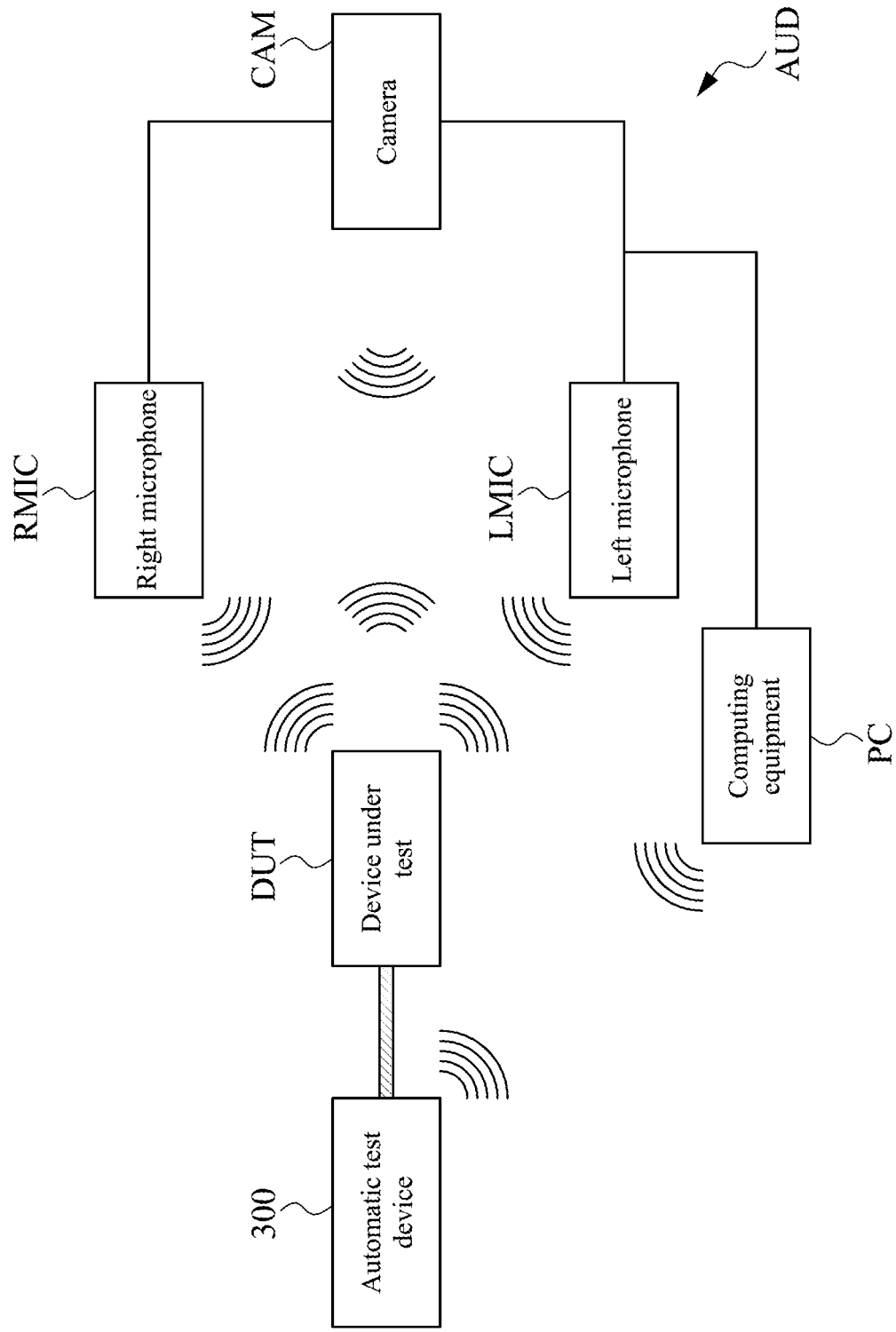
FIG. 3 is a block diagram of a part of an automatic test system, in accordance with an embodiment shown in FIG. 1.

An embodiment of a part of the function test stop ST3 is illustrated in FIG. 3, in accordance with the automatic test system 100 shown in FIG. 1. In such embodiment, it is illustrates that whether the image display function and the voice function of the devices under test DUT are functional. The automatic test device 300 shown in FIG. 3 is similar to the automatic test device 200 shown in FIG. 2, which will not discuss the same herein.

As illustrated in FIG. 3, the automatic test device 300 is coupled to the device under test DUT, and transmits the test instructions to the device under test DUT, configured to trigger the device under test DUT to start the test operations. The audio equipment AUD includes a left microphone LMIC, a right microphone RMIC, and a camera CAM. The audio equipment AUD is coupled to the device under test DUT and the computing equipment PC. In some embodiments, each of the left microphone LMIC and the right microphone RMIC is a directional microphone, and is configured to increase an accuracy of sound record.

As discussed above, the audio equipment AUD is configured to assist the test operations. For example, the audio equipment AUD is configured to capture the video signals generated from the device under test DUT and configured to transmit the video signals to the computing equipment PC, for analyzing and generating the test results by the computing equipment PC.

Figure 4:
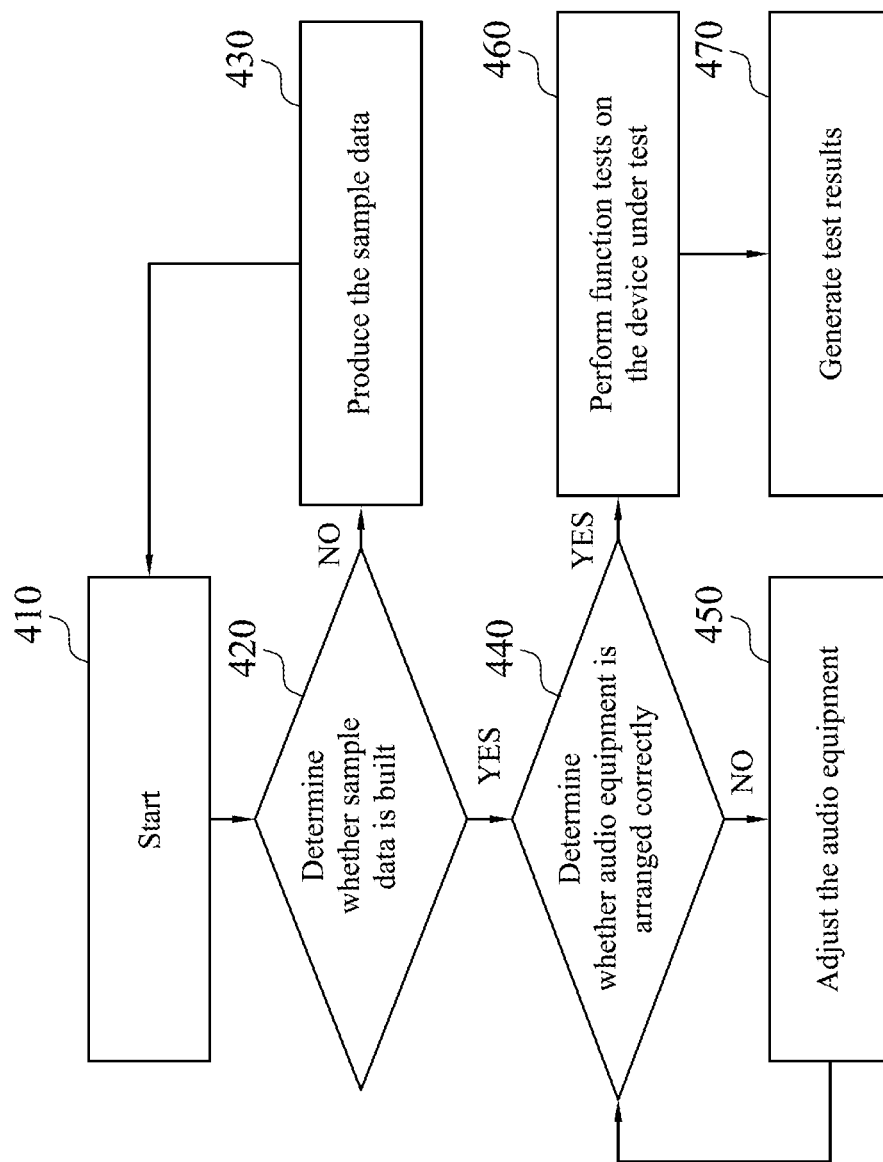
FIG. 4 is a flow chart of an automatic test method, in accordance with an embodiment of the present disclosure.

With reference to FIGS. 3 and 4, FIG. 4 is a flow chart of an automatic test method 400 applied in the automatic test device 300 shown in FIG. 3.

As illustrated in FIG. 4, in block 410, the automatic test method 400 starts, including testing the image display function and the audio function.

In the block 420, whether the sample data is built is determined by the computing equipment PC. The sample data represent default data (i.e., the signals output from the device under test DUT without dysfunction) to be compared with captured data during test process. The sample date is needed to be prepared before normal test process. In some embodiments, the sample data are indicated as continuous color photos. In some embodiments, the sample data are indicated as continuous voice. In some embodiments, the sample data are indicated as continuous video and voice. For example, the sample data represent the images displayed or voice played by a normal television.

If the sample data is not built, the block 430 is operated continuously.

In the block 430, the sample data is produced by the computing equipment PC, and then the block 410 is operated repeatedly.

If the sample data is built, the block 440 is operated.

In the block 440, whether the audio equipment AUD is arranged correctly is determined by the computing equipment PC. In some embodiments, with reference to FIG. 3, whether each of the left microphone LMIC, the right microphone RMIC and the camera CAM is arranged correctly is determined by the computing equipment PC at the same time. For example, whether the left microphone LMIC and the right microphone RMIC are arranged reversely, or whether the camera CAM correctly records an entire illustration or the like displayed by the device under test DUT, is determined.

If the audio equipment AUD is not arranged correctly, the block 450 is operated.

In the block 450, the audio equipment AUD is driven by the computing equipment PC and the arrangement of the audio equipment AUD is adjusted properly by the computing equipment PC. In some examples, a location of the audio equipment AUD relative to the device under test DUT is detected by a detector (not shown) included in the computing equipment PC, and the configuration of the audio equipment AUD is adjusted to reach the arrangement for the test operations by a driver (not shown) included in the computing equipment PC.

The block 440 is operated again continuously after operating the block 450, until the determined result from the block 440 shows that the audio equipment AUD is arranged correctly, and the block 460 is operated since then.

If the audio equipment AUD is arranged correctly, the block 460 is operated.

In the block 460, the function tests of the device under test DUT are performed by the automatic test device 300 and the audio equipment AUD, wherein the function tests include the image display function test and the audio function test of the device under test DUT.

The block 470 is operated continuously, and the test results are generated by analyzing and comparing by the computing equipment PC. The test results represent that whether the device under test DUT is dysfunctional.

Figure 6:
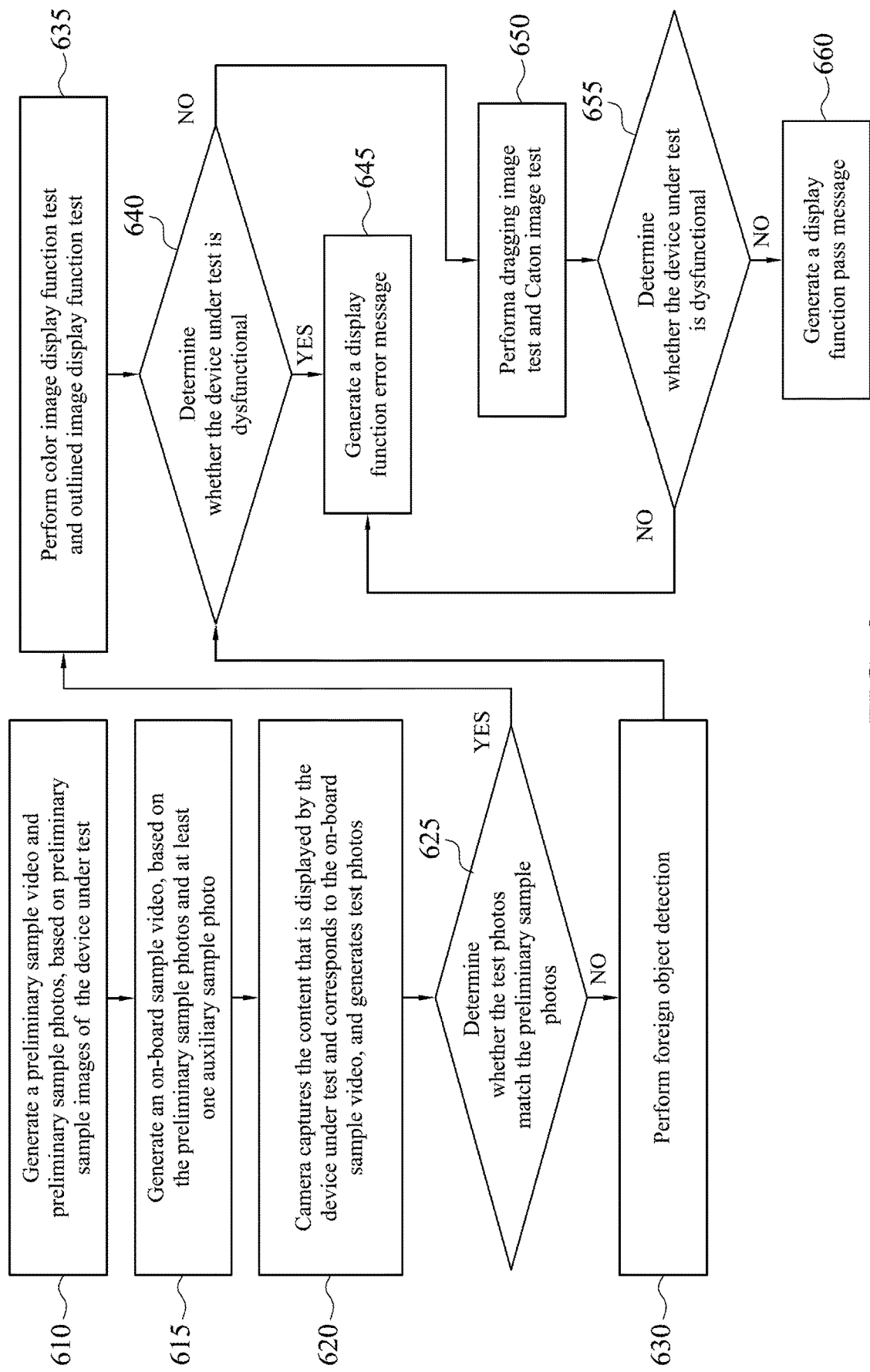
FIG. 6 is a flow chart of an automatic test method, in accordance with an embodiment shown in FIG. 4.

FIG. 6 is a flow chart of a test method for testing the image display function of the device under test, in accordance with an embodiment shown in FIG. 4. As illustrated in FIG. 6, it reaches a good test performance in a way that various image display functions including, for example, a foreign object detection, a color image display function and an outlined image display function, are tested continuously and automatically.

In the block 610, the automatic test device or the computing equipment generates preliminary sample video and preliminary sample photos, based on preliminary sample images of the device under test corresponding to the brand or the model number thereof. The preliminary sample video and the preliminary sample photos are indicated as a comparison standard (i.e., a control standard or a standard template) for testing the subsequent devices under test.

In an example, for the device under test with the specific brand and the model number, first of all, featured images of this device under test are transmitted to the device under test by the computing equipment. These featured images are displayed by the device under test. At the same time, images that displayed by the device under test are captured by the camera and featured photos are generated.

The featured images represent features of static image illustration including, for example, a location of the displayed patterns and a center location. One exemplary embodiment of the featured photos is illustrated in FIG. 5A, which is a position pattern 501 of the device under test.

Figure 5A:
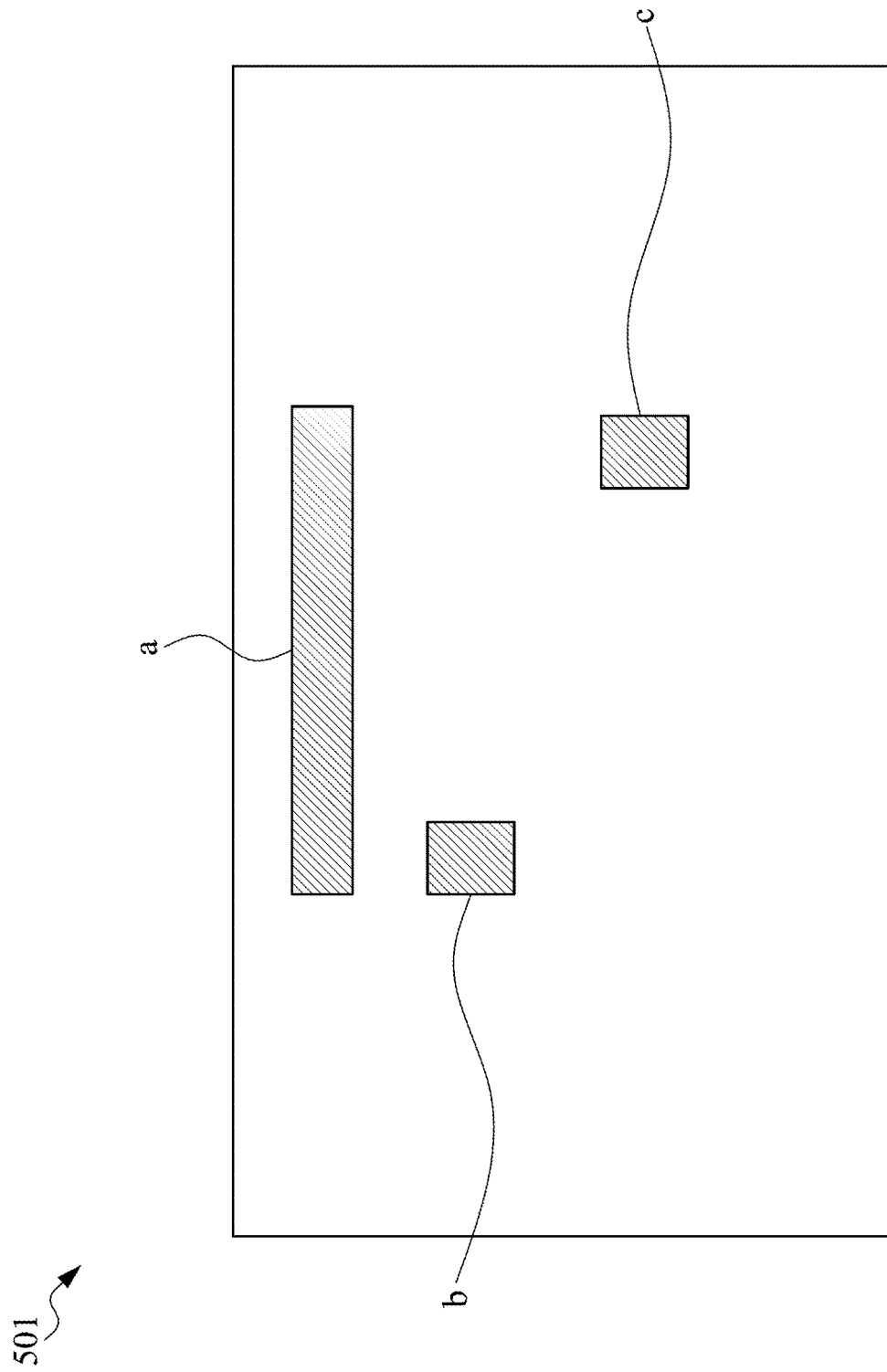
FIG. 5A is a schematic diagram of a located image, in accordance with an embodiment of the present disclosure.

As illustrated in FIG. 5A, the position pattern 501 includes at least one located pattern a, b or c. At least two of the located patterns a, b, and c correspond to different locations at a displayed illustration of the device under test, and have different areas.

With continued discussion, the featured photos are transmitted to the computing equipment, and the preliminary sample images are generated by the computing equipment based on these featured photos. Subsequently, these preliminary sample images are cascaded to generate the preliminary sample video by the computing equipment.

The preliminary sample video (and the preliminary sample images) represent features of dynamic image illustration including, for example, alterations of background color blocks display, colors, and motion blur image. The preliminary sample video is cascaded by various preliminary sample photos. In another way to explain, a display illustration of the preliminary sample video at one moment is indicated as one of the preliminary sample images. One exemplary embodiment of the preliminary sample images is illustrated in FIG. 5B, which is a color block position pattern 502.

Figure 5B:
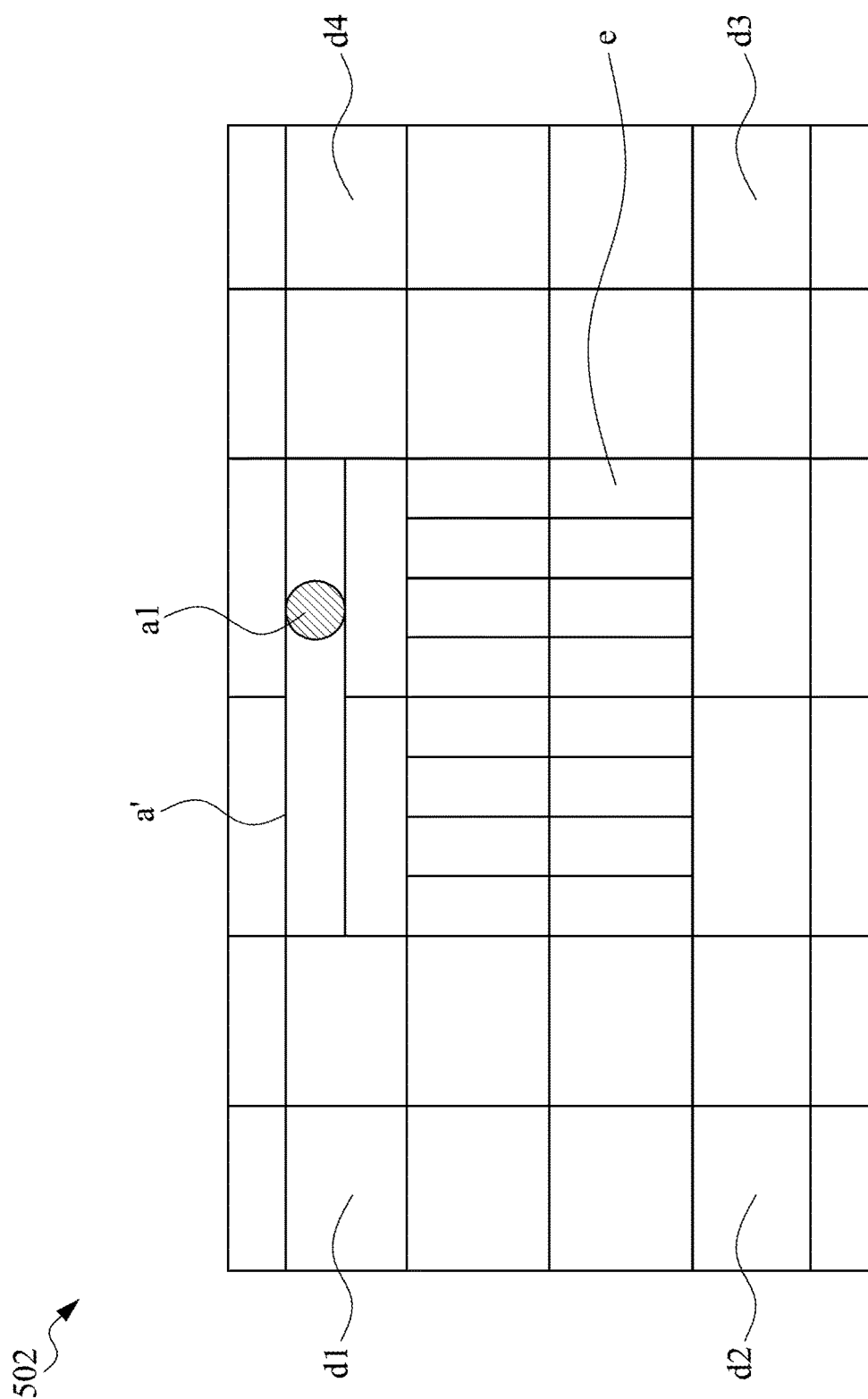
FIG. 5B is a schematic diagram of a located color block image, in accordance with an embodiment of the present disclosure.

As illustrated in FIG. 5B, the color block position pattern 502 includes a located pattern a' that corresponds to the located pattern a of the mentioned featured photo (i.e., the position pattern 501), wherein the located pattern a' has a circular pattern a1. The color block position pattern 502 further includes color blocks d1, d2, d3 and d4, and a color section at the middle of the color blocks d1, d2, d3 and d4. The color blocks d1, d2, d3 and d4 have different colors from various color gamut. The color section e has continuous colors that belong to the continuous and multiple color gamut. The other color block position patterns 502 are alternative images based on the color block position patterns 502 shown in FIG. 5B. For example, in another color block position pattern 502, the color blocks d1, d2, d3 and d4 are arranged differently, and a relative arrangement between the circular pattern a1 and the located pattern a' is also different from that is shown in FIG. 5B. For instance, the color blocks d1, d3, d2 and d4 are arranged clockwise in another color block position patterns 502.

In some embodiments, the content of display corresponding to the color blocks d1, d2, d3 and d4 and/or the located pattern a' of the preliminary sample video change with the playback time of the preliminary sample video. In some examples, the content of display corresponding to the color blocks d1, d2, d3 and d4 of the preliminary sample video rotates with the playback time of the preliminary sample video. In some embodiments, the content of display corresponding to the circular pattern a1 moves forward and backward horizontally in the located pattern a' with the playback time of the preliminary sample video. In some embodiments, the content of display corresponding to the color blocks d1, d2, d3 and d4 of the preliminary sample video rotates clockwise with the playback time of the preliminary sample video, and simultaneously, the circular pattern a1 moves from the leftmost located pattern a' to the rightmost located pattern a' and moves from the rightmost located pattern a' to the leftmost located pattern a'. A time during the changing of these patterns is referred to as a period and the preliminary sample video plays the preliminary sample photos repeatedly in this period. Therefore, the changing patterns in the preliminary sample video and design of these patterns are used to test the image display function.

In another example, the featured images of the device under test with the specific brand and model number include the position pattern 501 shown in FIG. 5A and the color block position pattern 502 shown in FIG. 5B, and these featured images are played by this device under test. Compared to the example discussed above, the images are captured at different timing by the camera and the preliminary sample images are then generated, and the preliminary sample video is further generated.

With continued operation of these two examples, the device under test plays the preliminary sample video, and the images are captured at different timing by the camera and the preliminary sample photos are then generated for being indicated as comparison standard illustrations.

As a result, the preliminary sample photos are display illustrations that captured the illustrations displayed by the device under test at some timing by the camera, and the preliminary sample photos are almost equal to the preliminary sample images (assumed that the device under test is not abnormal/dysfunctional). Alternatively stated, one example of the preliminary sample photos is the illustration shown in FIG. 5A or 5B.

The block 615 is operated continuously. In the block 615, on-board sample video is generated based on the preliminary sample photos and at least one auxiliary sample photo. The preliminary sample photos are color images, and the auxiliary sample photo is a grey level image.

As discussed above, the preliminary sample photos are a color images shown as FIG. 5A or 5B, and the preliminary sample photos have various arrangements of the color patterns respectively. In addition, the auxiliary sample photo may be the grey level image with mono-color.

In the present embodiment, both of the preliminary sample video and the on-board sample video are generated by the computing equipment. In another embodiment, the computing equipment transmits the preliminary sample photos and the auxiliary sample photo to the automatic test device. Subsequently, the automatic test device generates both of the preliminary sample video and the on-board sample video, which is not limited by the present disclosure.

In some embodiments, combining the preliminary sample photos and at least one auxiliary sample photo is performed by inserting auxiliary sample photos into the preliminary sample photos. Since the preliminary sample photos are color images and the auxiliary sample photos are grey level images, the on-board sample video includes color images and grey level images.

In some embodiments, the preliminary sample photos are a set of photos with a period of the same patterns repeatedly. In the period, the auxiliary sample photos are inserted evenly into the preliminary sample photos. For example, the period that the patterns of the preliminary sample photos repeat their changing is about 2.2 second, and one of the auxiliary sample photos is inserted into the preliminary sample photos of each period every 0.2 second.

Therefore, in each of the period of the on-board sample video has twelve auxiliary sample photos.

The block 620 is operated continuously. In the block 620, the automatic test device orders the device under test play the on-board sample video that is produced in the block 615. At the same time, the camera captures the content that is displayed by the device under test and corresponds to the on-board sample video, and generates test photos. For example, the camera captures one photo every 250 millisecond (msec), and the camera captures ten photos continuously in each period. That is, during the device under test performing the image display function, the camera captures photos of the on-board sample video at different timing. These captured photos are indicated as the test photos sample by the camera. Subsequently, the camera transmits the test photos to the computing equipment, and the block 625 is operated continuously.

In the block 625, the computing equipment compares the test photos in the block 620 with the preliminary sample photos in the block 615, to determine whether the test photos match the preliminary sample photos.

In some embodiments, the operation of comparing the test photos with the preliminary sample photos includes the operation of comparing each of the test photos with the preliminary sample photos sequentially, to determine whether each of the test photos matches one of the preliminary sample photos. In some examples, the foresaid comparing operation is indicated as a template matching, according to whether the test photos template match to the preliminary sample photos.

When one of the test photos do not match to any one of the preliminary sample photos, it represents that such test photo is not a photo that corresponds to the position pattern 501 shown in FIG. 5A or the color block position pattern 502 shown in FIG. 5B. Assumed that the device under test has functional image display function, this test photo may correspond to the auxiliary photo, and it causes that this test photo does not match to all of the preliminary sample photos. On the other hand, assumed that the device under test has dysfunctional image display function, this test photo captured by the camera may not being different from the content of the on-board sample video, and it causes that this test photo does not match to the preliminary sample photos.

If the test photos do not match to the preliminary sample photos, the block 630 is operated.

In the block 630, the computing equipment performs the foreign object detection on the test photos, for comparing the test photos and determining that whether the test photos have any abnormal patterns or spots. The method of the foreign object detection is discussed in detail below with reference to FIG. 7.

The block 640 is operated continuously. In the block 640, whether the device under test is dysfunctional is determined by the computing equipment. Alternatively stated, whether the device under test passes the foreign object detection is determined by the computing equipment.

When the test photos of the device under test pass the foreign objection detection, which is determined by the computing equipment, the block 650 is operated. Alternatively stated, when a result determined in the block 640 shows that the device under test is not dysfunctional, the block 650 is operated.

When the test photos of the device under test do not pass the foreign objection detection, which is determined by the computing equipment, the block 645 is operated. Alternatively stated, when a result determined in the block 640 shows that the device under test is dysfunctional, the block 645 is operated for generating a display function error message by the computing equipment. In some examples, in the block 645, a notice message (i.e., the display function error message) is generated in an illustrating module of the device under test by the computing equipment, in order to notice operators that this device under test does not pass the image display function test.

The block 625 is operated continuously, when the test photos match the preliminary sample photos, the block 635 is operated. Alternatively stated, at least one of the test photos matches at least one of the preliminary sample photos.

In the block 635, the color image display function test and the outlined image display function test are performed by the computing equipment, which is configured to compare the test photos and determine whether the test photos have abnormal displayed colors and whether the test photos have abnormal outlined patterns.

The block 640 is operated continuously. In the block 640, whether the device under test is dysfunctional is determined by the computing equipment. Alternatively stated, whether the device under test passes the color image display function test and the outlined image display function test are determined by the computing equipment.

When the test photos of the device under test pass the color image display function test and the outlined image display function test, which are determined by the computing equipment, the block 650 is operated. When the test photos of the device under test do not pass the color image display function test and the outlined image display function test, which is determined by the computing equipment, the block 645 is operated. As discussed above, the display function error message is generated by the computing equipment.

In some embodiments, in the block 625, since the test photos are color photos such as that shown in FIG. 5B, whether the colors are abnormal is determined by comparing the color sections e of the test photos with the preliminary sample photos correspondingly.

In addition, in the outlined image display function test operations, whether the outlined patterns are abnormal (e.g., distortion or fragment) is determined by comparing the respective patterns of the test photos with the preliminary sample photos correspondingly.

Subsequently, when results of the foreign objection detection corresponding to the block 630, and the color image display function test and the outlined image display function test corresponding to the block 635, all pass, the block 650 is operated respectively.

In the block 650, a motion blur image test and a Caton image test are performed by the computing equipment, which is configured to compare the test photos and determine whether the test photos have abnormal patterns or miss part of patterns, for example, to determine whether the test photos have multiple shadows in one pattern.

In the above discussed embodiment, the preliminary sample photos include figures such as that shown in FIG. 5B, and there multiple and continuous preliminary sample photos are alternative with a set of patterns in a specific period. Therefore, the test photos captured by the camera are photos of the on-board sample video at several timing, and are sequentially captured photos of the on-board sample video as it displays.

As such, in the motion blur image test operations, whether the circular pattern a1 is abnormal during the alternative duration is determined by comparing the continuous test photos captured by the camera with the preliminary sample photos correspondingly. For example, several incomplete circular patterns a1 are illustrated in a same test photo, and these incomplete circular patterns a1 are motion blur afterimages of the located pattern a'. That is, such image is motion blur. In another way to explain, when the device under test displays the on-board sample video, some patterns have multiple shadows in this operation even the on-board sample video is able to be displayed normally.

In addition, in the Caton image test operations, similarly, whether the color blocks d1, d2, d3 and d4 are abnormal during the alternative duration is determined. For example, an arrangement of each relative position of the color blocks d1, d2, d3 and d4 in each of the test photos is identical to one another, and these color blocks d1, d2, d3 and d4 are Carton images. In another way to explain, when the device under test displays the on-board sample video, only one illustration of such video is displayed and such video does not output normally.

The block 655 is operated continuously. In the block 655, whether the device under test is dysfunctional is determined by the computing equipment. Alternatively stated, whether the device under test passes the motion blur image test and the Caton image test are determined.

When the test photos of the device under test pass the motion blur image test and the Caton image test, which are determined by the computing equipment, the block 660 is operated. Alternatively stated, when a result determined in the block 650 shows that the device under test is not dysfunctional, the block 660 is operated. When the test photos of the device under test do not pass the motion blur image test and the Caton image test, which are determined by the computing equipment, the block 660 is operated. Alternatively stated, when a result determined in the block 650 shows that the device under test is dysfunctional, the block 645 is operated. As discussed above, the display function error message is generated by the computing equipment.

In the block 660, a display function pass message is generated by the computing equipment, based on the determined result. The display function pass message indicates that this device under test does not have dysfunctional image display functions.

Figure 7:
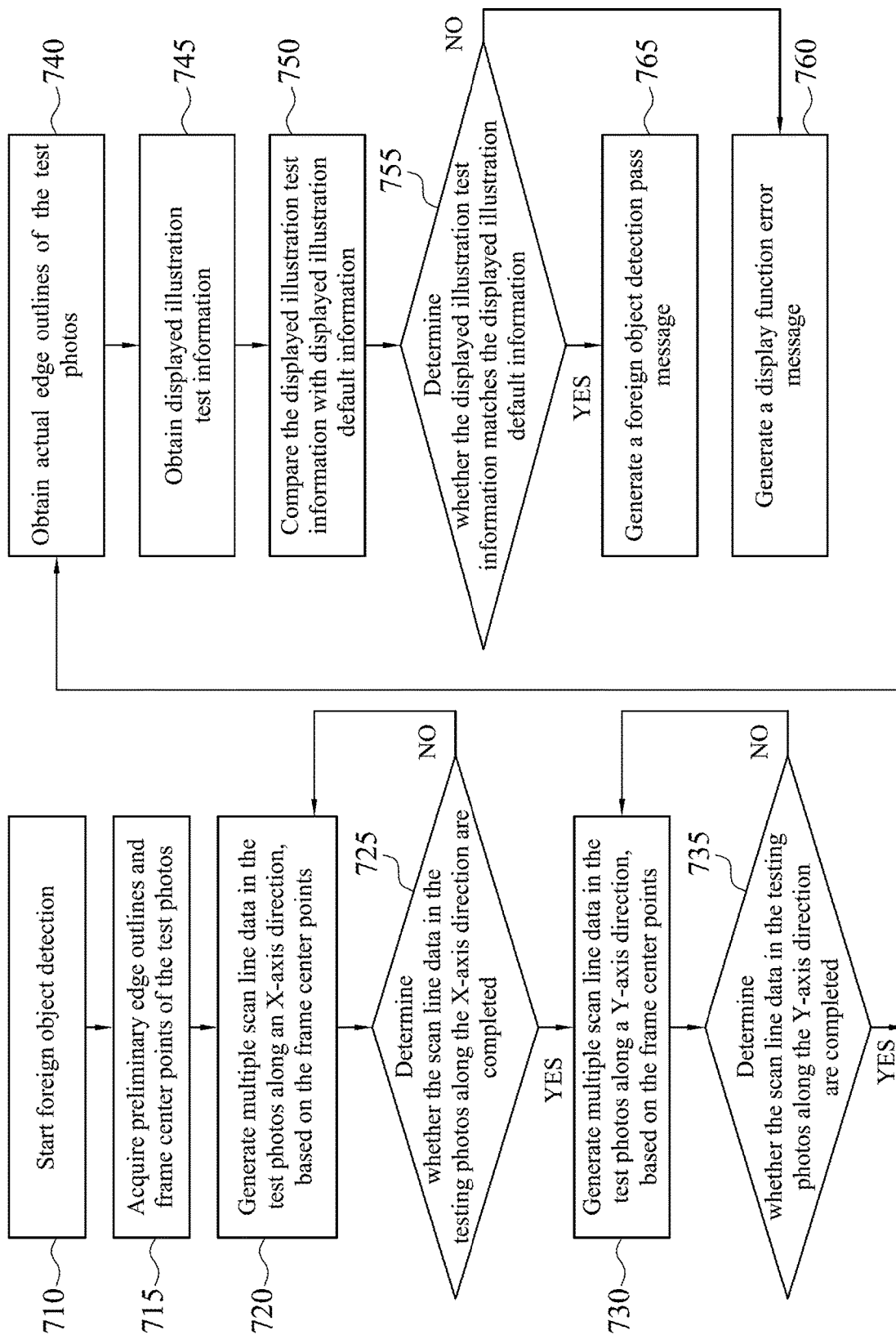
FIG. 7 is a flow chart of a method of foreign object detection, in accordance with an embodiment shown in FIG. 6.

With further reference to FIG. 7, a flow chart of a method of the foreign object detection, which is operated in the block 630, is discussed below.

As illustrated in FIG. 7, in the block 710, the foreign object detection starts.

In the block 715, preliminary edge outlines and frame center points of the test photos are obtained by the computing equipment, based on the test photos. An example of the preliminary edge outlines and frame center points of the test photos are indicated as a preliminary edge EDO shown in FIG. 8A and a center point CEO, respectively.

The block 720 is operated continuously, multiple scan line data in the test photos along an X-axis are generated by the computing equipment, based on the frame center points. The scan line data are one dimensional data line extending from a center to the preliminary edge outline of each photos.

In some embodiments, as illustrated in FIG. 8A, first of all, a first scan line data SCANX0 of one of the testing photos is obtained. The first scan line data SCANX0 passes through the center point CEO and extends along the X-axis direction. Subsequently, other scan line data SCANX of this testing photo are obtained. These other scan line data SCANX are parallel to the first scan line data SCANX0. Therefore, the first scan line data SCANX0 is the scan line data that passes through the center point CEO, and the scan line data SCANX are other scan line data that are parallel to the first scan line data SCANX0 and are distributed in the whole testing photo.

The block 725 is operated continuously, whether the scan line data the testing photos along the X-axis direction of are completed is determined by the computing equipment. When a result determined in the block 725 shows that it is not completed, the block 720 is operated repeatedly. When the result determined in the block 725 shows that it is completed, the block 730 is operated.

In the block 730, multiple scan line data in the test photos along a Y-axis direction of are generated by the computing equipment, based on the frame center points. The scan line data are one dimensional data line extending from a center to the preliminary edge outline of each photos.

Figure 8B:
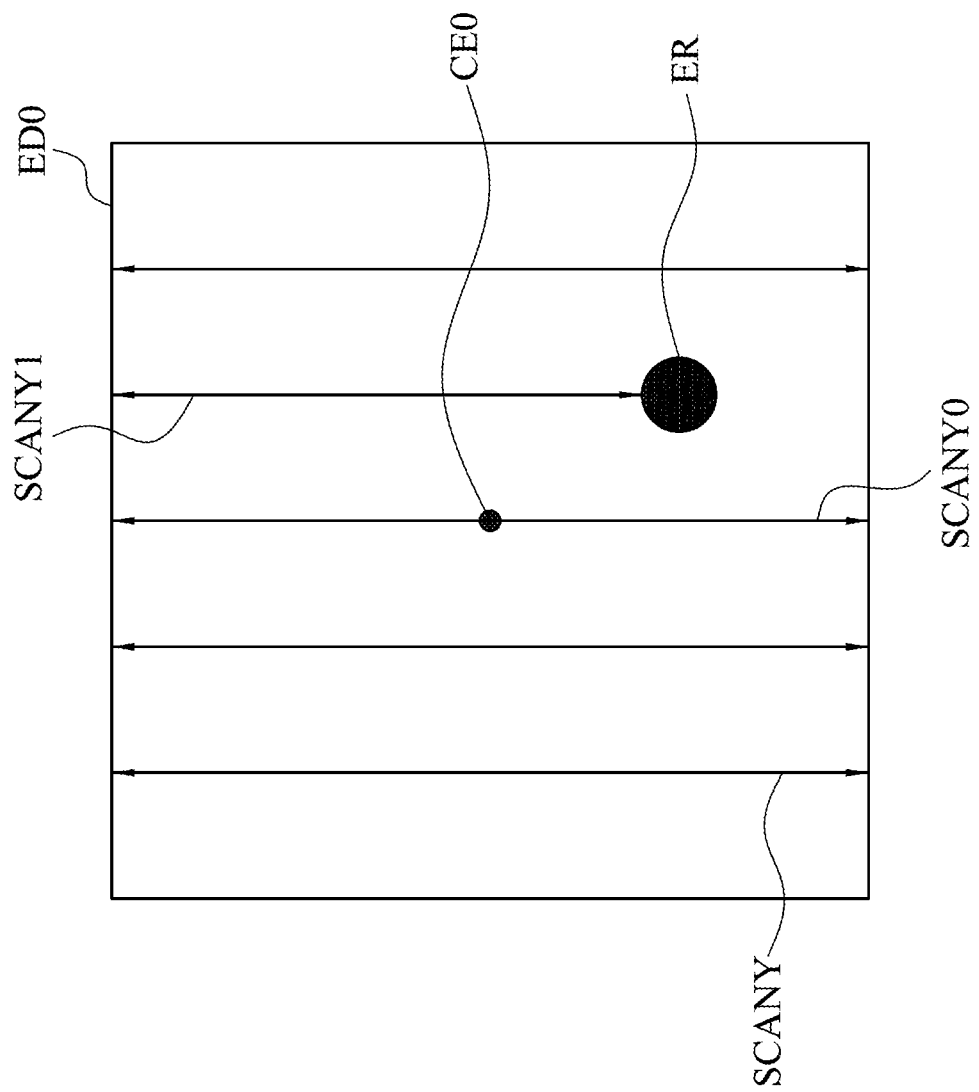
FIG. 8B is a schematic diagram of a test photo, in accordance with an embodiment shown in FIG. 7.

In some embodiments, as illustrated in FIG. 8B, first of all, a first scan line data SCANY0, which passes through the center point CEO along the Y-axis direction, of one of the testing photos is obtained. The first scan line data SCANY0 passes through the center point CEO and extends along the Y-axis direction. Subsequently, other scan line data SCANY of this testing photo are obtained. These other scan line data SCANY are parallel to the first scan line data SCANY0. Therefore, the first scan line data SCANY0 is the scan line data that passes through the center point CEO, and the scan line data SCANY are other scan line data that are parallel to the first scan line data SCANY0 and are distributed in the whole testing photo.

The block 735 is operated continuously, whether the scan line data in the testing photos along the Y-axis direction of are completed is determined by the computing equipment. When a result determined in the block 735 shows that it is not completed, the block 730 is operated repeatedly. When the result determined in the block 735 shows that it is completed, the block 740 is operated.

In the block 740, actual edge outlines of the test photos are obtained by the computing equipment, based on multiple scan line data in two different directions of the corresponding test photos.

Figure 8C:
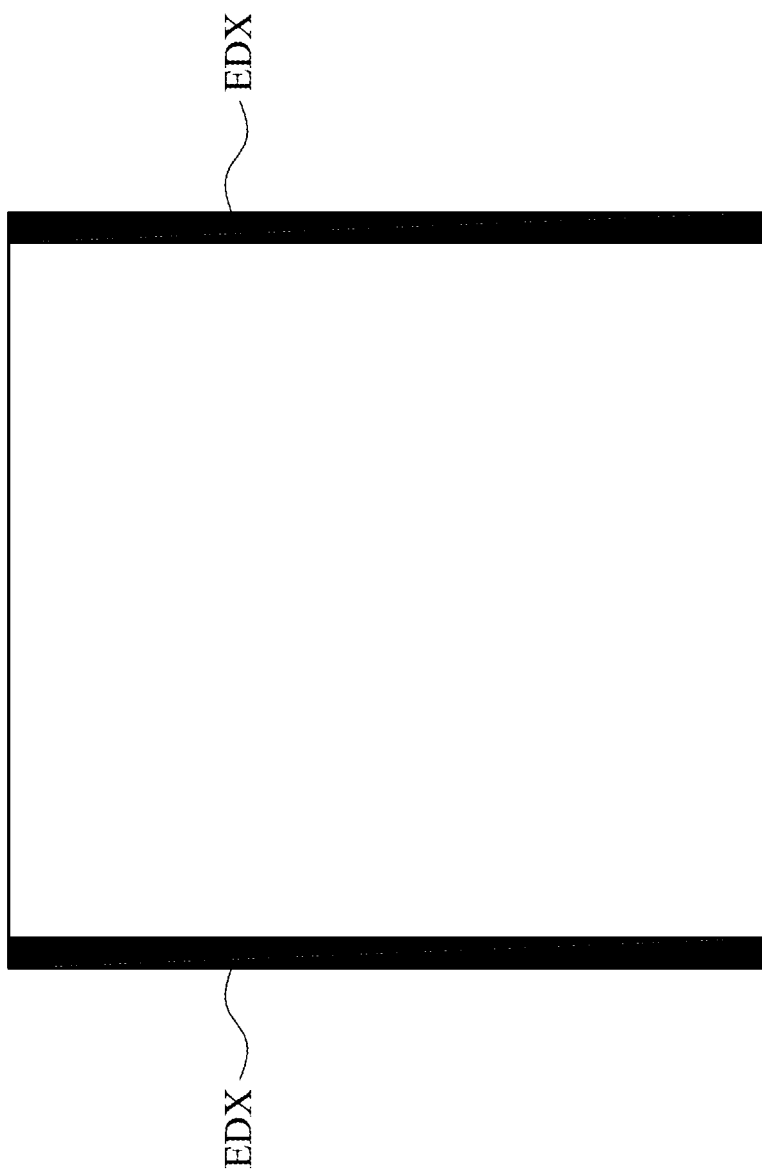
FIG. 8C is a schematic diagram of a test photo, in accordance with an embodiment shown in FIG. 8A.

In some embodiments, a part of the actual edge outline of one of the test photos is illustrated in FIG. 8C. The multiple scan line data SCANX in the FIG. 8A is utilized to depict an actual outline of the corresponding test photo, and this outline is referred to as a displayed outline of an actual display along the Y-axis direction when the corresponding device under test performs the image display functions. Similarly, a part of the actual edge outline of one of the test photos is illustrated in FIG. 8C. The multiple scan line data SCANY in the FIG. 8D is utilized to depict an actual outline of the corresponding test photo, and this outline is referred to as a displayed outline of an actual display along the X-axis direction when the corresponding device under test performs the image display functions.

In some embodiments, as illustrated in FIGS. 8B and 8D, when the displayed illustration that is displayed by the illustrating module of the device under test includes a foreign object (e.g., a block spot ER shown in FIG. 8D), the displayed illustration of the device under test shows false images when it displays the on-board sample video. Therefore, the test photos captured by the camera also include this foreign object. When one end of the scan line data SCANY reach this foreign object, this end of the scan line data SCANY considers the foreign object as an edge of displayed illustration, and the corresponding scan line data SCANY stop extending. As a result, a length of the scan line data SCANY1 shown in FIG. 8B is different from a length of other scan line data SCANY. It causes that the actual edge outline obtained subsequently is abnormal, and the foreign object is determined, as illustrated in FIG. 8D.

Accordingly, edge information of one of the testing photos along the Y-axis direction is obtained by the computing equipment, such as an edge outline EDX shown in FIG. 8C. Similarly, edge information of one of the testing photos along the X-axis direction is obtained by the computing equipment, such as an edge outline EDY shown in FIG. 8D. As a result, an actual edge outline of the whole corresponding testing photos is known according to both of the edge outline EDX and the edge outline EDY.

The block 745 is operated continuously. Displayed illustration test information of the device under test is obtained by the computing equipment, based on the actual edge outline. In another way to explain, a testing result performed by the device under test in practical is transferred to as a corresponding displayed illustration information (i.e., the displayed illustration test information). The displayed illustration test information include, for example, a displayed illustration size of the device under test, a false image size, and a position of the false image relative to the whole displayed illustration. Similarly, the device under test with functional display functions has corresponding displayed illustration default information.

The block 750 is operated continuously. The displayed illustration test information and the displayed illustration default information are compared by the computing equipment.

In some embodiments, some parameters including, for example, an aspect ratio and an area, of the displayed illustration test information and thereof the displayed illustration default information are compared by the computing equipment.

In the block 755, whether the displayed illustration test information matches the displayed illustration default information is determined by the computing equipment. Alternatively stated, whether the device under test passes the foreign object detection is determined by the computing equipment.

In some embodiments, when both of the aspect ratio and the area of the displayed illustration test information are in corresponding deviations of the displayed illustration default information, the displayed illustration test information and the displayed illustration default information are matched, which is determined by the computing equipment. That is, the device under test passes the foreign object detection is determined. In contrast, when the displayed illustration test information and the displayed illustration default information are not matched, the device under test does not pass the foreign object detection is determined.

When the displayed illustration test information does not match the displayed illustration default information, which is determined by the computing equipment, the block 760 is operated for generating the display function error message by the computing equipment. In some examples, in the block 760, the notice message is generated in the illustrating module of the device under test by the computing equipment, in order to notice the operators that this device under test does not pass the foreign object detection.

When the displayed illustration test information matches the displayed illustration default information, which is determined by the computing equipment, the block 765 is operated. Alternatively stated, when a test result of the foreign object detection determined in the block 755 shows that it passes, the block 765 is operated.

In the block 765, the foreign object detection pass message is generated by the computing equipment, based on the determined result. The foreign object detection pass message indicates that the displayed illustration of this device under test does not have foreign objects. The block 640 in FIG. 6 is operated continuously, for testing other display function tests subsequently.

To conclude various tests regarding to the display function, according to the methods shown in FIGS. 6 and 7, the image display functions including, for example, the foreign object detection, the color image display function, the outlined image display function, the motion blur image test and the Caton image test, of the device under test are operated to be tested. Accordingly, it raises the performance of test operations by testing several image display functions continuously.

Figure 9A:
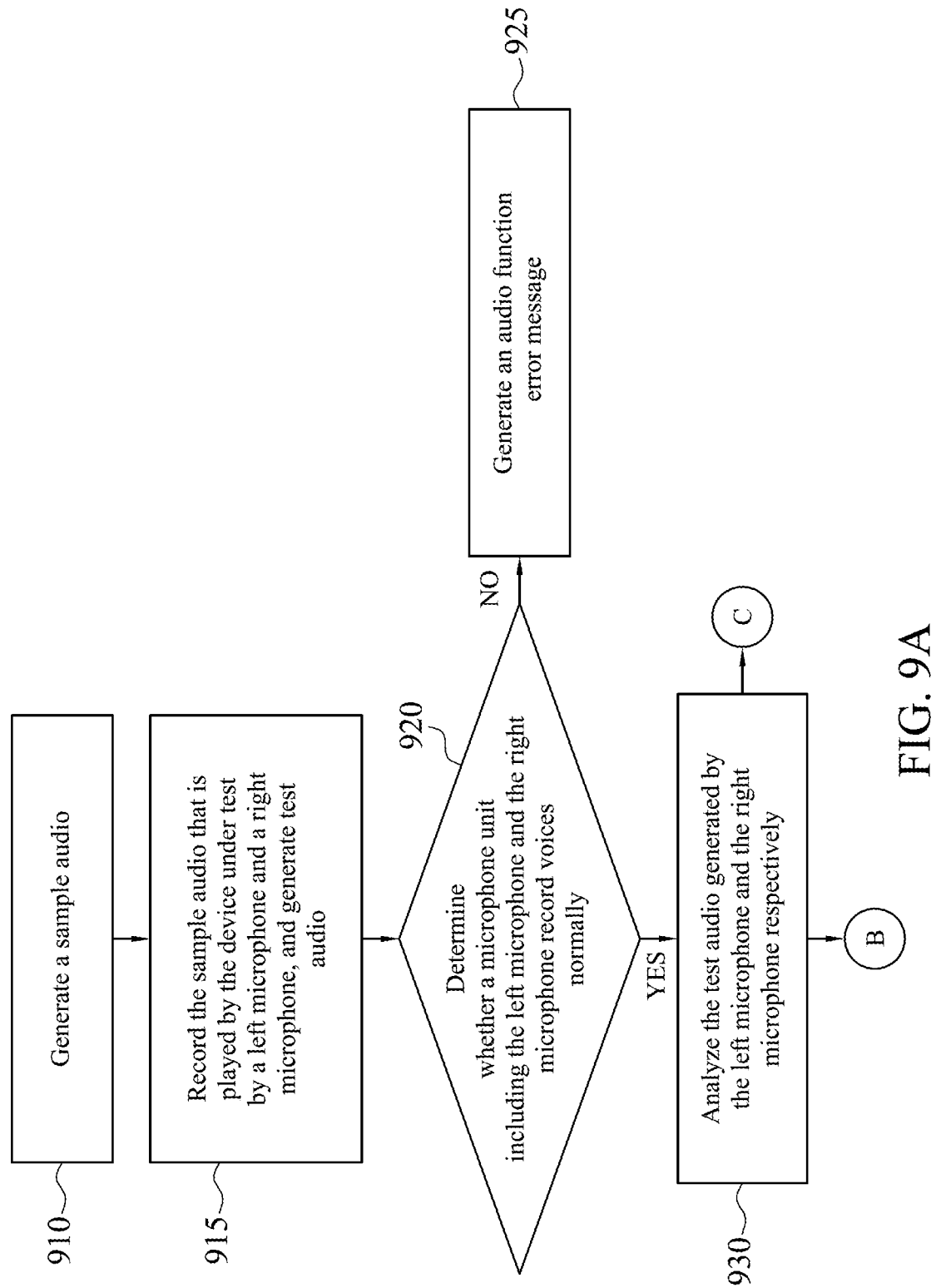
FIGS. 9A, 9B and 9C are flow charts of an automatic test method, in accordance with an embodiment shown in FIG. 4.
Figure 9B:
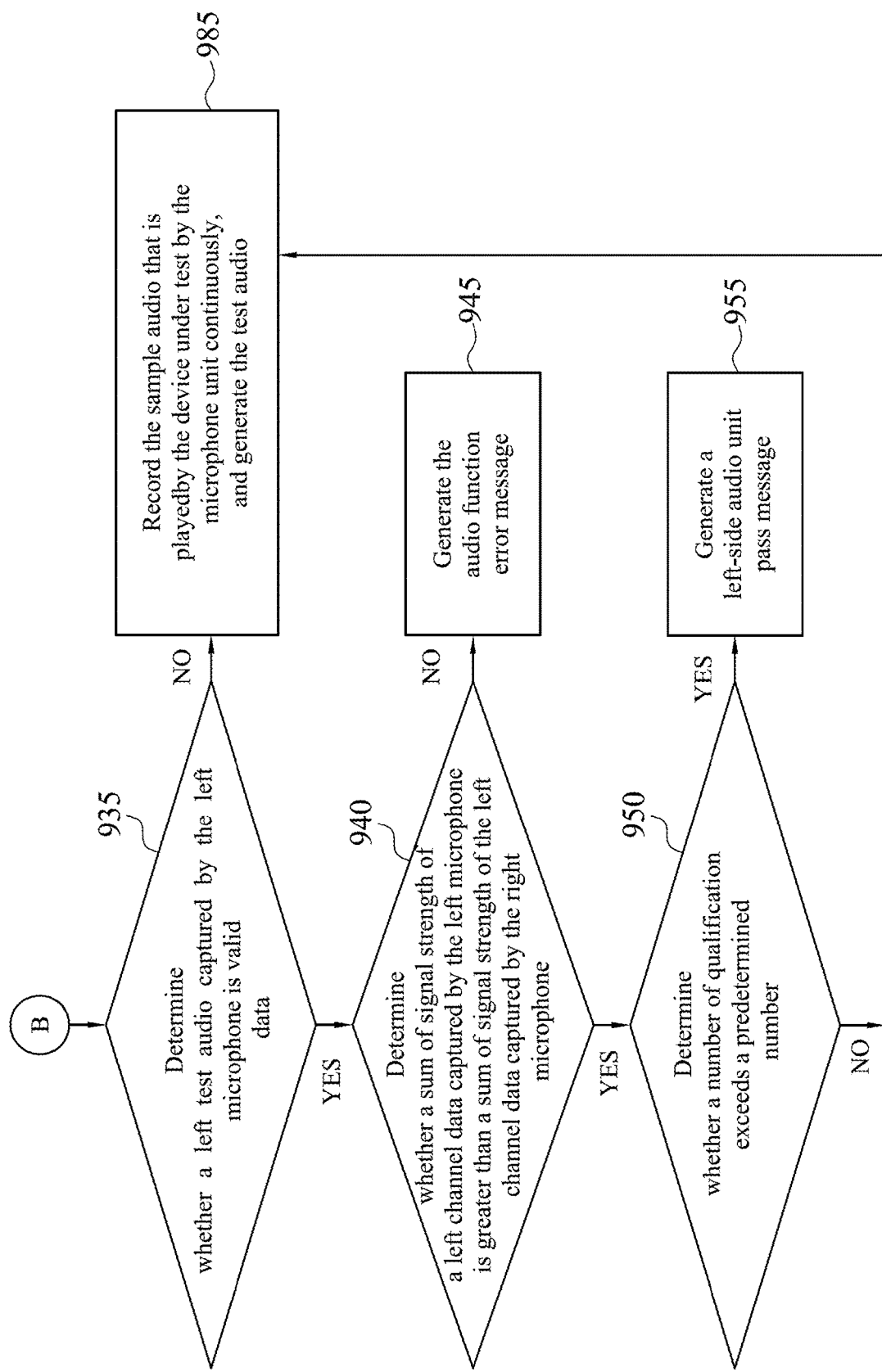
Figure 9C:
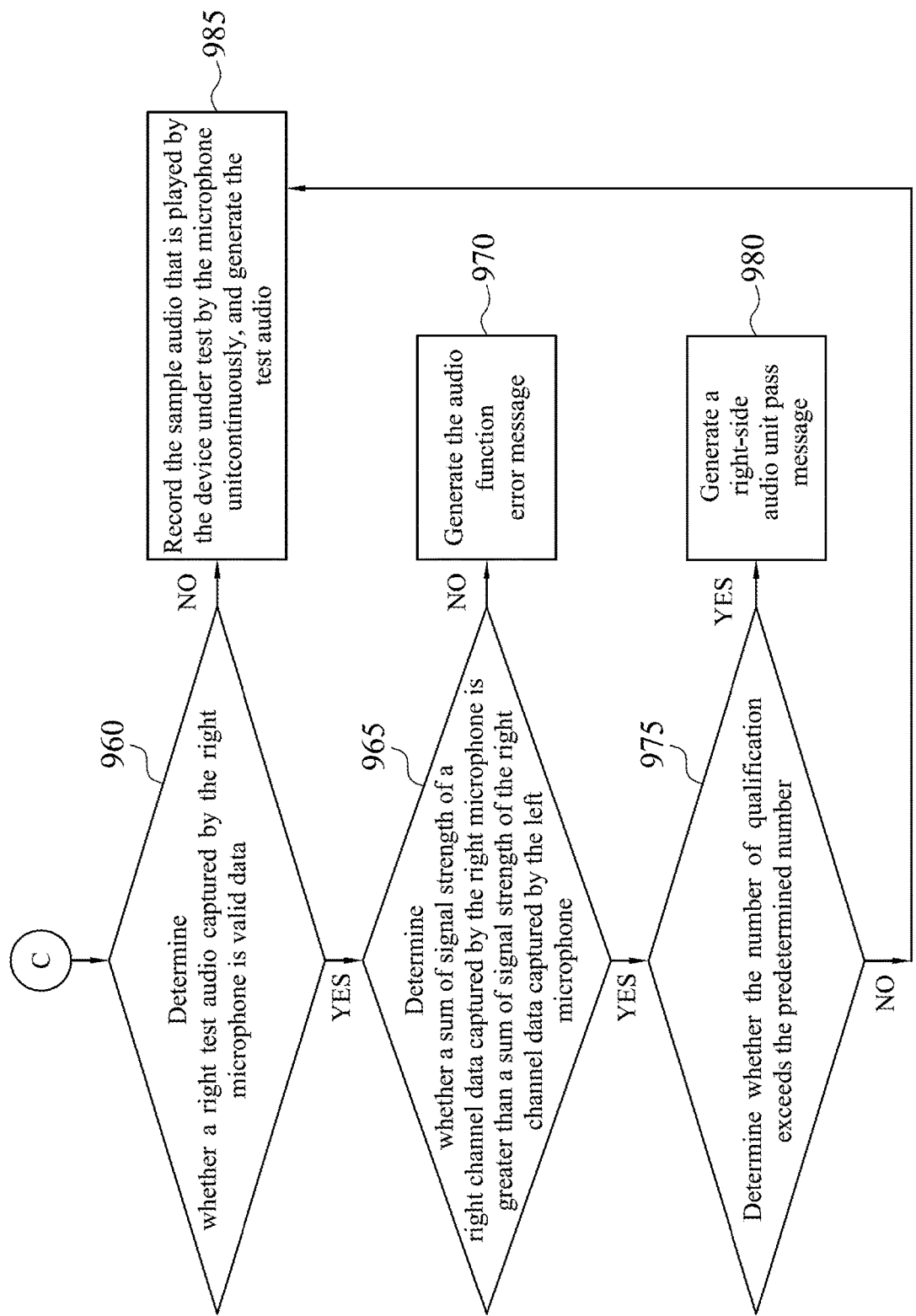

FIGS. 9A, 9B and 9C are flow charts of an automatic test method, in accordance with an embodiment shown in FIG. 4.

In the block 910, a sample audio is generated by the automatic test device or the computing equipment, and is configured to be indicated as the comparison standard (i.e., standard template) for testing subsequent devices under test.

In some embodiments, the sample audio includes channel tags and channel data, and the sample audio includes multiple repeated portions of audio data. The audio data have periods that are the same as one another. The channel tags include left channel tags and right channel tags, configured to be indicated as trigger signals for testing left channel and testing right channel, respectively, of the device under test. The channel data includes left channel data and right channel data, configured to be indicated as content to be compared in left channel test and right channel test, respectively.

In some embodiments, the sample audio includes left channel sound and right channel sound. The left channel sound includes left channel tags, right channel tags, and left channel data. The right channel sound includes left channel tags, right channel tags, and right channel data. In the period, as the left channel sound playing with time, the data of the left channel sound includes the left channel tags, the left channel data, and the right channel tags sequentially. Besides, in the same period, as the right channel sounds playing with time, the data of the left channel sound includes the left channel tags, the right channel tags, and the right channel data sequentially. The left channel data is configured to test left-side audio output functions, including, for example, determining whether a left-side speaker of the device under test has a normal playing function. The right channel data is configured to test right-side audio output functions, including, for example, determining whether a right-side speaker of the device under test has a normal playing function. Accordingly, in the period, it is able to test the left-side audio output functions and the right-side audio output functions of the device under test, simultaneously.

Figure 10A:
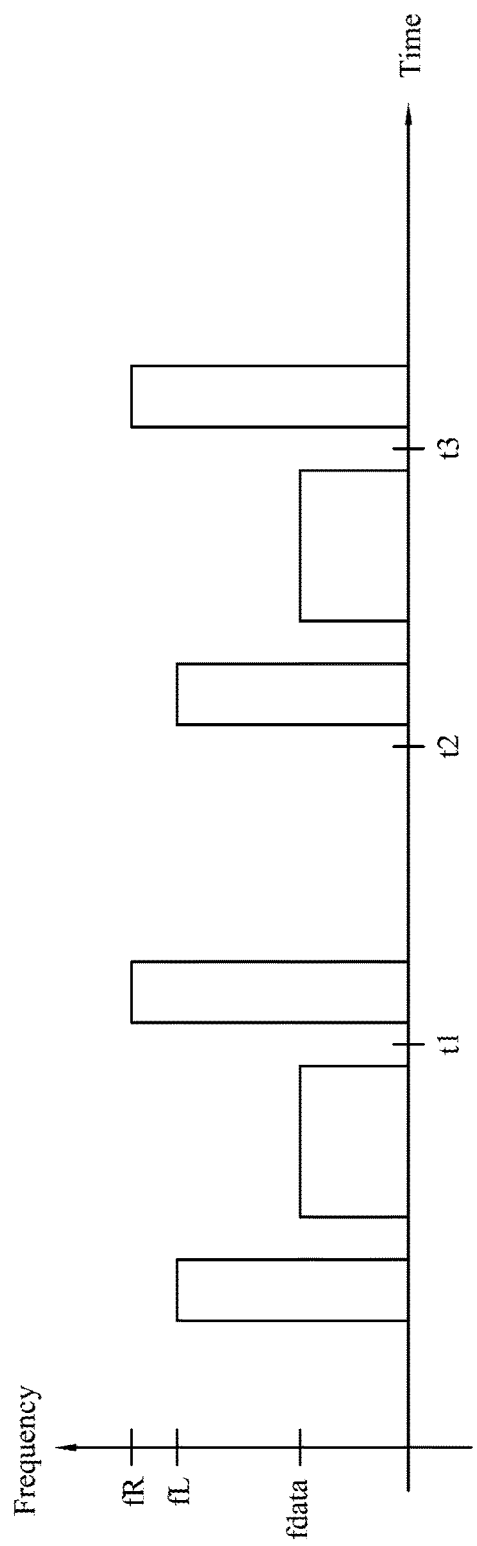
FIG. 10A is a schematic diagram of a sample audio, in accordance with an embodiment shown in FIGS. 9A, 9B and 9C.

FIG. 10A is the left channel sound, in accordance with an embodiment of the present disclosure. In one period (which is during the time t1 and t2, and intervals between each two of the time t1, t2, and t3 is same as one another), as time goes, the content of the data includes the left channel tags, the left channel data, the right channel tags, and a blank. In another way to explain, a period of the left channel sound includes a left sample period t1 and a right sample period t2. In the left sample period t1, the content of the data includes the left channel tags and the left channel data. In the right sample period t2, the content of the data includes the right channel tags and the blank.

Figure 10B:
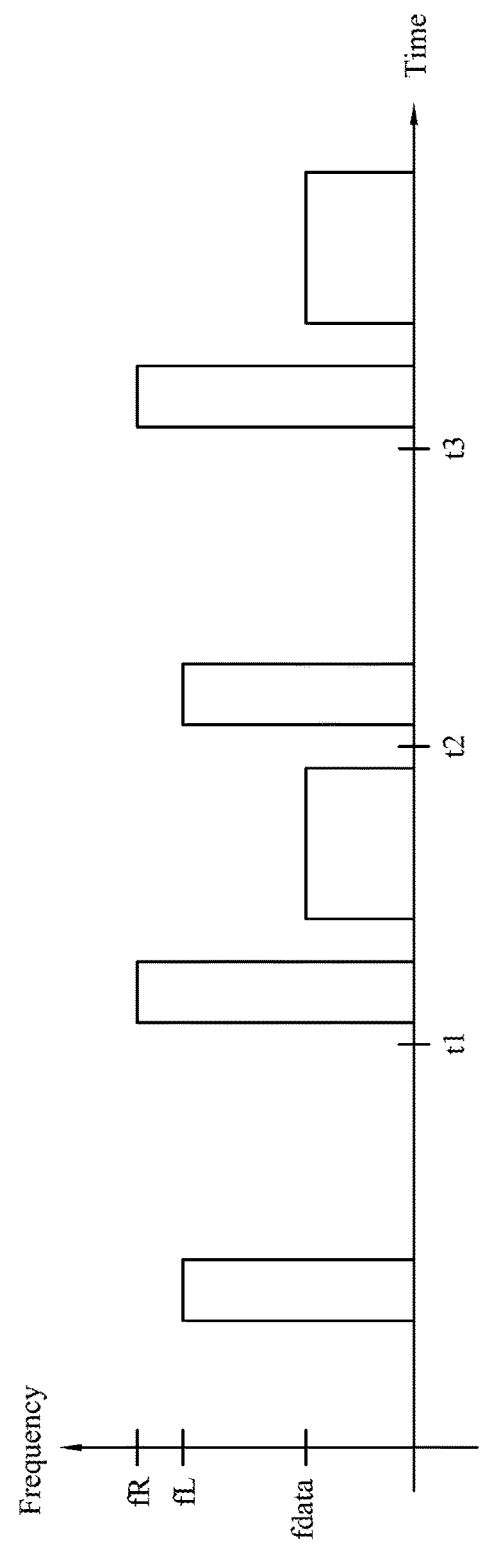
FIG. 10B is a schematic diagram of a sample audio, in accordance with an embodiment shown in FIGS. 9A, 9B and 9C.

Similarly, FIG. 10B is the right channel sound, in accordance with an embodiment of the present disclosure. In one period including the time t1 and the time t2, as time goes, the content of the data includes the left channel tags, a blank, the right channel tags, and the right channel data. As discussed above, a period of the right channel sound includes a left sample period t1 and a right sample period t2. In the left sample period t1, the content of the data includes the left channel tags and the blank. In the right sample period t2, the content of the data includes the right channel tags and the right channel data.

The left channel sound is provided to an output of a left-side audio unit of the device under test, and the right channel sound is provided to an output of a right-side audio unit of the device under test. Utilizing the left channel sound and the right channel sound which are played by the left-side audio unit and the right-side audio unit of the device under test, respectively, and utilizing a data design of left channel sound and the right channel sound, it increases an accuracy of the testing for the left-side audio unit and the right-side audio respectively, and it is also configured to test that whether the left-side audio unit and the right-side audio are arranged oppositely.

As illustrated in FIGS. 9A-9C, in the block 915, the sample audio that is played by the device under test is recorded by a left microphone and a right microphone, and test audio is generated. The left microphone and the right microphone are turned on by the audio equipment.

In some embodiments discussed above, a left-side audio unit of the device under test outputs the left channel sound, and a right audio unit of the device under test outputs the right channel sound at the same time. Accordingly, the left microphone and the right microphone record the left channel sound and the right channel sound output by the device under test simultaneously, and generate left test audio and right left test audio, which is indicated as the test audio, simultaneously.

Similarly, if both of the playing function of the audio units of the device under test and the recording function of the microphones are normal, the content of the test audio corresponds to the content of the sample audio. Alternatively stated, the left channel sound and the right channel sound include the left channel tags, the right channel tags, the left channel data and the right channel data, respectively.

The block 920 is operated continuously, whether a microphone unit including the left microphone and the right microphone records voices normally is determined by the computing equipment. It is utilized by the computing equipment that the computing equipment analyzes the test audio recorded by the microphone unit which is referred to as the left microphone and the right microphone. When the microphone unit does not record voices normally, the block 925 is operated.

In the block 925, an audio function error message is generated by the computing equipment. The audio function error message indicates that the microphone unit does not record voices normally, and the microphone unit should be rearranged or settled. In some examples, in the block 925, a notice message is generated in an illustrating module of the computing equipment, in order to notice operators that this device under test is unable to be tested for the audio function.

When the microphone unit records voices normally, the block 930 is operated.

In the block 930, the test audio including, the left test audio and the right test audio, recorded respectively by the left microphone and the right microphone is obtained by the computing equipment, and the test audio is analyzed subsequently. The left channel tags and the right channel tags included in the test audio exist at some moments of the test audio correspondingly, and are indicated as trigger tags of the left test audio and the right test audio respectively.

In some embodiments discussed above, the left-side audio unit and the right audio unit of the device under test play the left channel sound and the right channel sound at the same time. Therefore, both of the left microphone and the right microphone record the voices output from the left-side audio unit and the right audio unit, and they generate the left test audio and the right test audio, respectively. The test audio recorded by the left microphone and the right microphone is respectively analyzed by the computing equipment, and the blocks 935 and 960 are operated subsequently and simultaneously. The blocks 935, 940, 945, 950 and 955 are operated for analyzing the test audio recoded by the left microphone. The blocks 960, 965, 970, 975 and 980 are operated for analyzing the test audio recoded by the right microphone.

As illustrated in FIG. 9B, for analyzing the test audio recoded by the left microphone, first of all, in the block 935, whether the left test audio captured by the left microphone is valid data is determined by the computing equipment.

For example, when the left test audio recoded by the left microphone includes the left channel tags or the right channel tags, and a lasting time that the left channel data or the right channel data appearing/existing is longer than a predetermined value, the left channel data is determined to be valid data. The left channel data or the right channel data appears after the left channel tags or the right channel tags appears in the left test audio, respectively.

In the block 935, the operation for determining whether the left test audio recoded by the left microphone is valid data is also understood as that the signals (i.e., the content of the test audio) captured by the left microphone corresponding to the sample audio are significant. These signals exist and appear continuously and stably in the data during one period, and these signals are not other voices or noises. In some examples, whether the channel data which is behind the corresponding channel tag last for a while in the period is determined by the computing equipment. It is configured to determine that whether the test audio recorded by the microphone is the sample audio played by the device under test or the noise of testing environment.

When the left test audio captured by the left microphone is not valid data, the block 985 is operated.

In the block 985, the sample audio that is played by the device under test is recorded continuously by the microphone unit, and the test audio is generated. In addition, when a time playing the sample audio exceeds the predetermined value, a timeout message is generated by the computing equipment, and is illustrated in the illustrating module of the computing equipment, in order to notice operators that the audio function test should be performed once again or that failing the audio function test should be settled.

When the left test audio captured by the left microphone is valid data, the block 940 is operated.

In the block 940, a sum of signal strength of the channel data is computed by the computing equipment. The signal strength of the channel data is included in the left channel data captured by the left microphone during the period including, for example, the time t1 and t2 shown in FIGS. 10A and 10B. The sum of signal strength of the channel data indicates a volume of the significant data included in the left channel data. In the period, whether a sum of signal strength of the left channel data captured by the left microphone is greater than a sum of signal strength of the left channel data captured by the right microphone is determined by the computing equipment. It is configured to make sure that the volume of the data, which is played by the left-side audio unit and is captured by the left microphone, is greater than the volume of the data, which is played by the left-side audio unit and is captured by the right microphone. Accordingly, it is configured to determine that whether the left-side audio unit and the right-side audio unit are arranged oppositely.

When the sum of signal strength of the left channel data captured by the left microphone is not greater than the sum of signal strength of the left channel data captured by the right microphone, it indicates that the right microphone actually records the sample audio played by the left-side audio unit. Alternatively stated, the left-side audio unit and the right-side audio unit are arranged oppositely. The block 945 is operated subsequently.

In the block 945, the audio function error message is generated by the computing equipment. The audio function error message indicates that this device under test has dysfunctional audio output functions.

When the sum of signal strength of the left channel data captured by the left microphone is greater than the sum of signal strength of the left channel data captured by the right microphone, it indicates that the left microphone actually records the sample audio played by the left-side audio unit. Alternatively stated, the left-side audio unit and the right-side audio unit are arranged correctly.

Besides, when the sum of signal strength of the left channel data captured by the left microphone is greater than the sum of signal strength of the left channel data captured by the right microphone, a qualified number is added once by a counter, and the block 950 is operated subsequently.

In the block 950, whether the qualified number exceeds a predetermined number is determined by the computing equipment. Whether the qualified number of the left channel data captured by the left microphone is greater than the predetermined number is determined. It is configured to make sure that the left-side audio unit of the device under test is able to output audio signals stably and correctly.

When the qualified number of the left channel data captured by the left microphone is not greater than the predetermined number, it indicates that the left microphone does not continuously record the sample audio which is played by the left-side audio unit for a while. Alternatively stated, the left-side audio unit of the device under test has dysfunctional audio functions, or the recording time recorded by the left microphone is not long enough. The block 985 is back to be operated.

When the qualified number of the left channel data captured by the left microphone is greater than the predetermined number, it indicates that the left microphone continuously records the sample audio which is played by the left-side audio unit for a while. The block 955 is operated subsequently.

In the block 955, a left-side audio unit pass message is generated by the computing equipment. It indicates that this left-side audio unit of the device under test passes the audio function test.

As illustrated in FIG. 9C, for analyzing the test audio recoded by the right microphone, first of all, in the block 960, whether the right test audio captured by the right microphone is valid data is determined by the computing equipment.

For example, when the right test audio recoded by the right microphone includes the left channel tags or the right channel tags, and a lasting time that the left channel data or the right channel data appearing/existing is longer than the predetermined value as discussed above with reference to the block 935 in FIG. 9B, the right channel data is determined to be valid data.

Similarly, the operation, in the block 960, for determining whether the right test audio recoded by the right microphone is valid data is also understood as that the signals captured by the right microphone corresponding to the sample audio are significant. These signals exist and appear continuously and stably in the data during such period, and these signals are not other voices or noises. In some examples, whether the channel data which is behind the corresponding channel tag lasts for a while in the period is determined by the computing equipment. It is configured to determine that whether the test audio recorded by the microphone is the sample audio played by the device under test or the noise of testing environment.

When the right test audio captured by the right microphone is not valid data, it indicates that a recording time of the right the microphone is not long enough, and the block 985 is operated.

In the block 985, the sample audio that is played by the device under test is recorded continuously by the microphone unit, and the test audio is generated. Similarly, when the time playing the sample audio exceeds the predetermined value, the timeout message is generated by the computing equipment, and is illustrated in the illustrating module of the computing equipment, in order to notice operators that the audio function test should be performed once again or that failing the audio function test should be settled.

When the right test audio captured by the right microphone is valid data, the block 965 is operated.

In the block 965, a sum of signal strength of the channel data is computed by the computing equipment. The signal strength of the channel data is included in the right channel data captured by the right microphone during the period including, for example, the time t1 and t2 shown in FIGS. 10A and 10B. The sum of signal strength of the channel data indicates a volume of the significant data included in the right channel data. In the period, whether a sum of signal strength of the right channel data captured by the right microphone is greater than a sum of signal strength of the right channel data captured by the left microphone is determined by the computing equipment. It is configured to make sure that the volume of the data, which is played by the right-side audio unit and is captured by the right microphone, is greater than the volume of the data, which is played by the right-side audio unit and is captured by the left microphone. Accordingly, it is configured to determine that whether the right-side audio unit and the left-side audio unit are arranged oppositely.

When the sum of signal strength of the right channel data captured by the right microphone is not greater than the sum of signal strength of the right channel data captured by the left microphone, it indicates that the left microphone actually records the sample audio played by the right-side audio unit. Alternatively stated, the right-side audio unit and the left-side audio unit are arranged oppositely. The block 970 is operated subsequently.

In the block 970, the audio function error message is generated by the computing equipment. The audio function error message indicates that this device under test has dysfunctional audio output functions.

When the sum of signal strength of the right channel data captured by the right microphone is greater than the sum of signal strength of the right channel data captured by the left microphone, it indicates that the right microphone actually records the sample audio played by the right-side audio unit. Alternatively stated, the right-side audio unit and the left-side audio unit are arranged correctly.

Besides, when the sum of signal strength of the right channel data captured by the right microphone is greater than the sum of signal strength of the right channel data captured by the left microphone, a qualified number is added once by a counter, and the block 975 is operated subsequently.

In the block 975, whether the qualified number exceeds a predetermined number is determined by the computing equipment. Whether the qualified number of the right channel data captured by the right microphone is greater than the predetermined number is determined. It is configured to make sure that the right-side audio unit of the device under test is able to output audio signals stably and correctly.

When the qualified number of the right channel data captured by the right microphone is not greater than the predetermined number, it indicates that the right microphone does not continuously record the sample audio which is played by the right-side audio unit for a while. Alternatively stated, the right-side audio unit of the device under test has dysfunctional audio functions, or the recording time recorded by the right microphone is not long enough. The block 985 is back to be operated.

When the qualified number of the right channel data captured by the right microphone is greater than the predetermined number, it indicates that the right microphone continuously records the sample audio which is played by the right-side audio unit for a while. The block 980 is operated subsequently.

In the block 980, a right-side audio unit pass message is generated by the computing equipment. It indicates that this right-side audio unit of the device under test passes the audio function test.

In the blocks 955 and 980, the left-side audio unit pass message and the right-side audio unit pass message are generated by the computing equipment. It indicates that the left-side audio unit and the right-side audio unit of such device under test does not have dysfunctional audio functions.

To conclude the above tests associated to the audio functions, it is able to perform the audio output function tests on the device under test by the method illustrated in FIGS. 9A to 9C. The method illustrated in FIGS. 9A to 9C includes testing the voice output function of the left-side and the right-side audio units, and testing the relative arrangement of the left-side and the right-side audio units. Accordingly, it is able to analyze the left-side and the right-side audio units at the same time utilizing the designed sample audio, and it further increases the performance of the test operations.

In some embodiments, a frequency of the left channel tags is higher than a frequency of the left channel data. The frequency of the left channel tags is referenced as a frequency fL illustrated in FIGS. 10A and 10B, and is indicated as a trigger signal for analyzing the left microphone. A frequency of the right channel tags is higher than a frequency of the right channel data. The frequency of the right channel tags is referenced as a frequency fR illustrated in FIGS. 10A and 10B, and is indicated as a trigger signal for analyzing the right microphone. In addition, the frequency fR of the right channel tags is different from the frequency fL of the left channel tags. Accordingly, in the analyzing operations, it is able to distinguish the signals captured by the left microphone and by the right microphone.

In some embodiments, the frequencies fL and fR of the left channel tags and the right channel tags are in a range of 20,000 Hz to 15,000 Hz. It is considered that a frequency response below the frequency of 20,000 Hz is flat for general speakers or microphones, the frequency response above the frequency of 20,000 Hz decreases. Besides, human ears are not sensitive to voices with high frequency. Therefore, the frequency of the present disclosure is higher than 15,000 Hz and is lower than 20,000 Hz, and such frequency bandwidth of the signals is less sensitive to human ears and is also functional for the general speakers or microphones.

To conclude, it is able to increase the overall performance of the test operations, by the automatic test system performing various test functions on the device under test. The automatic test device includes various compatible transmission protocols, in order to match alternative brands or model numbers of the devices under test. The efficiency of the test operations are increased accordingly. The automatic test method includes the image display functions and the audio functions, wherein the automatic test method is applied in the automatic test system. Accordingly, it shortens the testing times and has good accuracy.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An automatic test device, configured to test functions of a device under test, comprising:
   a plurality of connection ports configured to couple to the device under test;
   a first processor coupled to the plurality of connection ports and configured to transmit a test instruction through the plurality of connection ports to the device under test,
   wherein the device under test is in a test mode after receiving the test instruction, and the first processor is configured to receive a test signal transmitted through the plurality of connection ports from the device under test when the device under test is in the test mode; and
   a transmission integrated interface coupled between the plurality of connection ports and the first processor, and configured to transmit at least one of the test instructions to the plurality of connection ports or the first processor,
   wherein the transmission integrated interface comprises a plurality of switches and a signal converter,
   wherein the plurality of switches form at least two different conduction paths between at the plurality of connection ports and the first processor by switching the plurality of switches,
   wherein one of the at least two conduction paths couples the signal converter for converting a signal format of the test signal or the test instruction and to transmit the converted test signal or the test instruction between the plurality of connection ports and the first processor, and
   the other one of the at least two conduction paths directly transmits the test signal or the test instruction between the plurality of connection ports and the first processor.

2. The automatic test device of the claim 1, wherein the plurality of connection ports comprises:
   a first protocol connection port coupled to the transmission integrated interface, and configured to transmit data with a first data transmission protocol to the transmission integrated interface.

3. The automatic test device of the claim 2, wherein the plurality of connection ports further comprises:
a second protocol connection port coupled to the transmission integrated interface, and configured to transmit data with a second transmission protocol to the transmission integrated interface, wherein the second data transmission protocol and the first data transmission protocol are incompatible.

4. The automatic test device of the claim 3, wherein the plurality of switches coupled to the first protocol connection port and the second protocol connection port, wherein the signal converter converts the second data transmission protocol to the first data transmission protocol.

5. The automatic test device of the claim 4, wherein at least one of the plurality of switches is coupled to a third protocol connection port, configured to couple to the transmission integrated interface and an electronic device and to transmit data with a third data transmission protocol between the transmission integrated interface and the electronic device.

6. The automatic test device of the claim 1, further comprising:
a second processor coupled to the first processor and the device under test, and configured to analyze the test signal and generate a test result.

7. An automatic test system, configured to test functions of a plurality of devices under test, comprising:
a transmission structure configured to carry the plurality of devices under test and transmit the plurality of devices under test to a plurality of function test stops correspondingly; and
a plurality of automatic test devices disposed on the transmission structure and configured to dispose the plurality of devices under test, each of the plurality of automatic test devices comprising:
a plurality of connection ports configured to couple to a device under test of the plurality of devices under test;
a processor coupled to the plurality of connection ports and configured to transmit a test instruction through the plurality of connection ports to the device under test, wherein the device under test is in a test mode after receiving the test instruction, and the processor is configured to receive a test signal transmitted through the plurality of connection ports from the device under test when the device under test is in the test mode; and
a transmission integrated interface coupled between the plurality of connection ports and the processor, and configured to transmit at least one of the test instructions to the plurality of connection ports or the processor,
wherein the transmission integrated interface comprises a plurality of switches and a signal converter,
wherein the plurality of switches form at least two different conduction paths between at the plurality of connection ports and the first processor by switching the plurality of switches,
wherein one of the at least two conduction paths couples the signal converter for converting a signal format of the test signal or the test instruction and to transmit the converted test signal or the test instruction between the plurality of connection ports and the first processor, and
the other one of the at least two conduction paths directly transmits the test signal or the test instruction between the plurality of connection ports and the first processor.

8. The automatic test system of the claim 7, wherein the plurality of connection ports comprises:
a first protocol connection port coupled to the transmission integrated interface, and configured to transmit data with a first data transmission protocol to the transmission integrated interface; and
a second protocol connection port coupled to the transmission integrated interface, and configured to transmit data with a second data transmission protocol to the transmission integrated interface,
wherein the second data transmission protocol and the first data transmission protocol are incompatible.

9. The automatic test system of the claim 8, wherein the plurality of switches coupled to the first protocol connection port and the second protocol connection port, wherein the signal converter converts the second data transmission protocol to the first data transmission protocol.

10. The automatic test system of the claim 7, further comprising:
at least one audio equipment arranged at least one of the plurality of function test stops and coupled to the plurality of automatic test devices and the plurality of devices under test, configured to capture signals transmitted from the plurality of devices under test to the plurality of automatic test devices.

* * * * *